(12) United States Patent
Nelson et al.

(10) Patent No.: US 10,990,109 B2
(45) Date of Patent: Apr. 27, 2021

(54) INTEGRATED CONNECTIVITY OF DEVICES FOR RESOURCE TRANSMISSION

(71) Applicant: BANK OF AMERICA CORPORATION, Charlotte, NC (US)

(72) Inventors: Mark Allan Nelson, Waxhaw, NC (US); Karen Lea MacQueen, Lyndhurst, OH (US); Ashish B. Tajpuria, San Francisco, CA (US); Stephen Philip Selfridge, Huntersville, NC (US); Steven Michael Twombly, Saco, ME (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 248 days.

(21) Appl. No.: 15/986,232

(22) Filed: May 22, 2018

(65) Prior Publication Data

US 2019/0361463 A1 Nov. 28, 2019

(51) Int. Cl.
*G05D 1/02* (2020.01)
*G06Q 10/08* (2012.01)
(Continued)

(52) U.S. Cl.
CPC ....... *G05D 1/0276* (2013.01); *G01C 21/3469* (2013.01); *G01C 21/3667* (2013.01);
(Continued)

(58) Field of Classification Search
CPC .. G05D 1/0276; G05D 1/0217; G05D 1/0022; G06F 16/29; G06F 16/9537;
(Continued)

(56) References Cited

U.S. PATENT DOCUMENTS 4,751,689 A 6/1988 Kobayashi
5,805,807 A * 9/1998 Hanson .................. B60R 11/02
370/340

(Continued)

FOREIGN PATENT DOCUMENTS

CA 2839208 A1 7/2014
CA 2820432 A1 12/2014
(Continued)

OTHER PUBLICATIONS

"Meet the car key that's also a contactless payment card", Retrieved on May 30, 2018, http://www.techradar.com/news/meet-the-car-key-thats-also-a-contactless-payment-card.
(Continued)

*Primary Examiner* — Christian Chace
*Assistant Examiner* — Michael F Whalen
(74) *Attorney, Agent, or Firm* — Michael A. Springs; Moore & Van Allen PLLC; Vaidehi Bachoti

(57) ABSTRACT

The preset invention relates to a system for integrated connectivity of devices to provide dynamic control and real-time routing of a vehicle for item transfer and vehicle performance. The system is configured for constructing a dynamic item file comprising one or more items associated with a user. The system is configured to identify an item collection initiation trigger and transmit an order placement control signal to an entity system of an item entity to initiate item transfer of the one or more items at a predetermined time interval. The system is configured to direct the vehicle to a first parking location associated with the geographic location parameter of the item entity. In addition, using a sensor device of the vehicle such as a weight sensor, an RFID sensor and/or a visual capture device, the system is structured to identify that the one or more items are located in the vehicle.

20 Claims, 10 Drawing Sheets

(51) Int. Cl.
*G01C 21/36* (2006.01)
*G01C 21/34* (2006.01)
*G05D 1/00* (2006.01)
*G06F 16/29* (2019.01)
*G06F 16/9537* (2019.01)
*G06K 19/07* (2006.01)

(52) U.S. Cl.
CPC ......... *G05D 1/0022* (2013.01); *G05D 1/0217* (2013.01); *G06F 16/29* (2019.01); *G06F 16/9537* (2019.01); *G06Q 10/08355* (2013.01); *G06K 19/0723* (2013.01)

(58) Field of Classification Search
CPC .......... G06Q 10/08355; G01C 21/3667; G01C 21/3469; G01C 21/3688; G01C 21/3685; G06K 19/0723
See application file for complete search history.

(56) References Cited

U.S. PATENT DOCUMENTS

| | | | |
|---|---|---|---|
| 6,526,335 | B1 | 2/2003 | Treyz et al. |
| 6,661,341 | B2 | 12/2003 | Masuda et al. |
| 7,520,440 | B2 | 4/2009 | Ortigosa Vallejo et al. |
| 7,729,204 | B2 | 6/2010 | Peng et al. |
| 7,742,941 | B2 | 6/2010 | Yamauchi |
| 8,170,960 | B1 | 5/2012 | Bill |
| 8,751,391 | B2 | 6/2014 | Freund |
| 9,292,832 | B2 | 3/2016 | Goel et al. |
| 9,413,827 | B2 | 8/2016 | Sharma et al. |
| 9,438,440 | B2 | 9/2016 | Burns et al. |
| 9,471,915 | B2 | 10/2016 | Fuerstenberg et al. |
| 9,496,736 | B1 | 11/2016 | Johansson et al. |
| 9,508,068 | B2 | 11/2016 | Mastrangelo et al. |
| 9,541,912 | B1 | 1/2017 | Grossman, IV et al. |
| 9,680,726 | B2 | 6/2017 | Sharma et al. |
| 9,717,012 | B2 | 7/2017 | Zakaria et al. |
| 9,742,740 | B2 | 8/2017 | Fransen |
| 9,774,497 | B2 | 9/2017 | Britt et al. |
| 9,774,507 | B2 | 9/2017 | Britt et al. |
| 9,801,000 | B2 | 10/2017 | Shao |
| 9,847,961 | B2 | 12/2017 | Shuman et al. |
| 9,900,171 | B2 | 2/2018 | Guedalia et al. |
| 9,900,172 | B2 | 2/2018 | Goel et al. |
| 10,121,289 | B1 | 11/2018 | Gravelle |
| 2003/0036378 | A1 | 2/2003 | Dent |
| 2003/0061109 | A1 | 3/2003 | Banerjee et al. |
| 2004/0177008 | A1 | 9/2004 | Yang |
| 2005/0184852 | A1 | 8/2005 | Lee |
| 2007/0088624 | A1 | 4/2007 | Vaughn et al. |
| 2008/0103686 | A1 | 5/2008 | Alberth et al. |
| 2008/0291054 | A1 | 11/2008 | Groft |
| 2008/0313052 | A1 | 12/2008 | Otto et al. |
| 2010/0161149 | A1 | 6/2010 | Nguyen et al. |
| 2013/0073094 | A1 | 3/2013 | Knapton et al. |
| 2013/0138515 | A1 | 5/2013 | Taniguchi et al. |
| 2013/0163453 | A1 | 6/2013 | Lin et al. |
| 2013/0226651 | A1 | 8/2013 | Napper |
| 2013/0282472 | A1 | 10/2013 | Penilla et al. |
| 2014/0207281 | A1 | 7/2014 | Angle et al. |
| 2014/0279081 | A1 | 9/2014 | Marx et al. |
| 2014/0279208 | A1* | 9/2014 | Nickitas ............. G06Q 30/0631 705/26.7 |
| 2014/0279596 | A1* | 9/2014 | Waris ................... G06Q 10/083 705/317 |
| 2015/0088617 | A1 | 3/2015 | Geist et al. |
| 2015/0106204 | A1 | 4/2015 | Pudar |
| 2015/0269521 | A1* | 9/2015 | Knapp ............ G06Q 10/08355 705/338 |
| 2015/0309484 | A1 | 10/2015 | Lyman |
| 2015/0323943 | A1 | 11/2015 | Chan |
| 2015/0338116 | A1 | 11/2015 | Furuta et al. |
| 2015/0358777 | A1 | 12/2015 | Gupta |
| 2016/0012726 | A1 | 1/2016 | Wang |
| 2016/0094883 | A1 | 3/2016 | Tidwell et al. |
| 2016/0162833 | A1 | 6/2016 | Garden |
| 2016/0197769 | A1 | 7/2016 | Britt et al. |
| 2016/0197772 | A1 | 7/2016 | Britt et al. |
| 2016/0197786 | A1 | 7/2016 | Britt et al. |
| 2016/0216123 | A1 | 7/2016 | Liao et al. |
| 2016/0244311 | A1* | 8/2016 | Burks ................ G06Q 30/0635 |
| 2017/0098376 | A1 | 4/2017 | Wang |
| 2017/0108348 | A1 | 4/2017 | Hansen et al. |
| 2017/0118307 | A1 | 4/2017 | Buearepaire et al. |
| 2017/0127230 | A1 | 5/2017 | Enriquez et al. |
| 2017/0290345 | A1 | 10/2017 | Garden et al. |
| 2017/0359343 | A1 | 12/2017 | Sterl et al. |
| 2017/0365030 | A1 | 12/2017 | Shoham et al. |
| 2017/0372294 | A1 | 12/2017 | Pelletier |
| 2018/0012224 | A1 | 1/2018 | Ricci |
| 2018/0025348 | A1 | 1/2018 | Shauh et al. |
| 2018/0025551 | A1 | 1/2018 | Centner |
| 2018/0039993 | A1* | 2/2018 | Rossi .................... G06Q 30/012 |
| 2018/0053140 | A1* | 2/2018 | Baca ..................... G06Q 10/087 |
| 2018/0089917 | A1 | 3/2018 | Obaidi |
| 2018/0190126 | A1* | 7/2018 | Teslenko ................ G08G 1/202 |
| 2018/0315313 | A1 | 11/2018 | Klochikhin et al. |
| 2018/0320908 | A1 | 11/2018 | Lorenz et al. |
| 2018/0357900 | A1 | 12/2018 | Wang |
| 2019/0050951 | A1 | 2/2019 | Goldberg et al. |
| 2019/0156281 | A1 | 5/2019 | Nelson et al. |
| 2019/0243842 | A1* | 8/2019 | Li .......................... G06F 16/322 |
| 2019/0244172 | A1* | 8/2019 | Carrier ................ G06Q 10/083 |
| 2019/0287063 | A1* | 9/2019 | Skaaksrud ........... B65D 88/524 |
| 2019/0287066 | A1* | 9/2019 | Kellaway, Jr. ..... G06Q 10/1097 |
| 2019/0360823 | A1* | 11/2019 | Nelson ............... G01C 21/3676 |
| 2020/0175429 | A1* | 6/2020 | Beaurepaire ........... G06N 7/005 |

FOREIGN PATENT DOCUMENTS

| | | |
|---|---|---|
| DE | 10316106 A1 | 10/2004 |
| JP | 2005309977 A | 11/2005 |
| JP | 2007202051 A | 8/2007 |
| JP | 2012189427 A | 10/2012 |
| JP | 2013200098 A | 10/2013 |
| JP | 2017027418 A | 2/2017 |
| KR | 20150020171 A | 2/2015 |
| WO | 2014015977 A2 | 1/2014 |
| WO | 2017177041 A2 | 10/2017 |
| WO | 2019014020 A1 | 1/2019 |

OTHER PUBLICATIONS

"The connected car: Visa looks ahead", Retrieved on May 30, 2018, https://usa.visa.com/visa-everywhere/innovation/visa-connected-car.html.

"In-car contactless payments: the next generation of mobile commerce", Retrieved on May 30, 2018, http://lisnr.com/resources/blog/in-car-contactless/payments-the-next-generation-of-mobile-commerce/.

"PayByCar E-ZPass Transponder in-Car Payments for Gas, Food & Services", Retrieved on May 30, 2018, http://www.autoconnectedcar.com/2018/02/paybycar-e-zpass-transponder-in-car-payments-for-gas-good-services/.

* cited by examiner

1000

CONSTRUCT A DYNAMIC ITEM FILE FOR A USER, WHEREIN THE DYNAMIC ITEM FILE COMPRISES ONE OR MORE ITEMS ASSOCIATED WITH THE USER
1010

IDENTIFY AN ITEM COLLECTION INITIATION TRIGGER
1020

TRANSMIT AN ORDER PLACEMENT CONTROL SIGNAL TO AN ENTITY SYSTEM OF AN ITEM ENTITY TO INITIATE ITEM TRANSFER OF THE ONE OR MORE ITEMS AT A PREDETERMINED TIME INTERVAL
1030

DETERMINE, FROM THE VEHICLE, A TRAVEL VECTOR TRIGGER OF THE VEHICLE, WHEREIN THE TRAVEL VECTOR TRIGGER COMPRISES AT LEAST A CURRENT GEOGRAPHIC LOCATION OF THE VEHICLE AND A CURRENT DIRECTION OF TRAVEL
1040

DETERMINE A TRAVEL ROUTE FOR THE VEHICLE TO DIRECT THE VEHICLE TO A FIRST PARKING LOCATION ASSOCIATED WITH THE GEOGRAPHIC LOCATION PARAMETER OF THE ITEM ENTITY
1050

TRANSMIT AN ITEM TRANSFER CONTROL SIGNAL TO THE ENTITY SYSTEM TO INITIATE ITEM TRANSFER OF THE ONE OR MORE ITEMS IN THE DYNAMIC ITEM FILE
1060

IN RESPONSE TO IDENTIFYING THAT THAT THE ONE OF MORE ITEMS ARE LOCATED IN THE VEHICLE, INITIATE A RESOURCE TRANSFER FROM A USER RESOURCE TO AN ENTITY RESOURCE
1070

FIG. 10

INTEGRATED CONNECTIVITY OF DEVICES FOR RESOURCE TRANSMISSION

FIELD OF THE INVENTION

The present invention relates to dynamic control and real-time routing of a vehicle for facilitating item transfer and enhancing vehicle performance.

BACKGROUND

Vehicles are commonly used by individuals to perform a variety of activities. However, despite the proliferation of vehicles, vehicles operate disparate from smart devices, appliances and other home receivers. Moreover, vehicles typically operate unconnected from particulars of the user activities associated with the user, which may adversely affect vehicle performance such as causing increased fuel consumption. Moreover, vehicles are typically not configured allow integration of item files associated with the user, vehicle operation and entity systems and devices, seamlessly and with ease, across various channels. A needs exists for systems and methods for seamless integration of vehicles, item files associated with the user, other user devices and entity systems for performing item transfers via a vehicle without adversely affecting vehicle performance and for improving the functionality and connectivity of vehicles.

The present invention addresses the foregoing needs and also provides improvement to technology by providing integrated connectivity of vehicles, smart devices, other user appliances, and entity systems. Moreover, the present invention provides dynamic control and real-time routing of a vehicle for affiliating item transfers with increased, speed, security and without adversely affecting vehicle performance.

SUMMARY

The following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

In one aspect, the present invention provides systems, methods and computer program products for integrated connectivity of devices for resource transmission. The invention is typically configured to provide dynamic control and real-time routing of a vehicle for item transfer and vehicle performance. The system environment of the present invention typically includes one or more computer processors, a memory, and a network communication device. Specifically, the system typically includes a memory device with computer-readable program code stored thereon, a communication device configured to establish operative communication with a plurality of networked devices via a communication network, and a processing device operatively coupled to the memory device and the communication device. In one embodiment, the processing device is configured to execute the computer-readable program code to. Construct a dynamic item file for a user, wherein the dynamic item file comprises one or more items associated with the user; identify an item collection initiation trigger based on identifying at least one of a current location of a vehicle associated with the user, historical vehicle transit information, current smart appliance parameters associated with the user, and user information; in response to the item collection initiation trigger, transmit an order placement control signal to an entity system of an item entity to initiate item transfer of the one or more items at a predetermined time interval, wherein the entity system is associated with at least one of the one or more items; determine, from the vehicle, a travel vector trigger of the vehicle, wherein the travel vector trigger comprises at least a current geographic location of the vehicle and a current direction of travel; in response to identifying that the travel vector trigger matches a geographic location parameter of the item entity: determine a travel route for the vehicle to direct the vehicle to a first parking location associated with the geographic location parameter of the item entity; transmit a control instruction to the vehicle, wherein the control instruction is configured to cause a display of the vehicle to present the travel route; and transmit an item transfer control signal to the entity system to initiate item transfer of the one or more items in the dynamic item file, wherein the item transfer control signal comprises the first parking location; identify, via a sensor device of the vehicle, an item transfer trigger based on identifying that the one or more items are located in the vehicle; and in response to the item transfer trigger, initiate, via the display of the vehicle, a resource transfer from a user resource to an entity resource In some embodiments or in combination with any of the previous embodiments, identifying that the one or more items are located in the vehicle further comprises: identifying, via a positioning system of the vehicle, that the vehicle is located at the first parking location; transmitting an activation control signal to the vehicle to cause the activation of the sensor device, based on (i) identifying opening of at least one of a door or a window of the vehicle, and (ii) determining that the sensor device is configured to detect a vehicle parameter within a predetermined proximity of at least one of the door or the window; retrieving the detected vehicle parameter from the sensor device; and identifying that the one or more items are located in the vehicle based on the detected vehicle parameter.

In some embodiments or in combination with any of the previous embodiments, the sensor device comprises at least one of an RFID sensor, a weight sensor or a visual capture device. In other words, the sensor device may refer to one or more of an RFID sensor, a weight sensor and/or a visual capture device.

In some embodiments or in combination with any of the previous embodiments, the processing device is further configured to execute the computer-readable program code to: store the dynamic item file comprising the one or more items in a temporary memory location, wherein transmitting the order placement control signal to the entity system comprises transmitting a pointer to the temporary memory location; identify an additional item associated with the user to be transferred from the entity; in response to determining that (i) the order placement control signal has been transmitted to the entity system and that (ii) the item transfer control signal has not been transmitted to the entity system, augment the dynamic item file with the additional item; and in response to determining that resource transfer from the user resource to the entity resource is successful, remove the dynamic item file from the temporary memory location.

In some embodiments or in combination with any of the previous embodiments, the processing device is further configured to execute the computer-readable program code to: store the dynamic item file comprising the one or more items in a temporary memory location, wherein transmitting the order placement control signal to the entity system comprises transmitting a pointer to the temporary memory location; identify an additional item associated with the user to be transferred from the entity; in response to determining that the item transfer control signal has been transmitted to the entity system, (i) prevent modification of the dynamic item file and (ii) construct an additional dynamic item file comprising the additional item; and in response to determining that resource transfer from the user resource to the entity resource is successful, remove the dynamic item file from the temporary memory location.

In some embodiments or in combination with any of the previous embodiments, the processing device is further configured to execute the computer-readable program code to: identify that the first parking location is occupied using a visual capture device associated with the first parking location; identify a second parking location parking location associated with the geographic location parameter of the item entity based on determining that the second parking location is not occupied; modify the travel route for the vehicle to direct the vehicle to the second parking location; and transmit an updated control signal to the entity system comprising the second parking location.

In some embodiments or in combination with any of the previous embodiments, the processing device is further configured to execute the computer-readable program code to: present a graphical representation of the vehicle location at the first parking location to a mobile device of an individual associated with the entity.

In some embodiments or in combination with any of the previous embodiments, determining the travel route further comprises determining an estimated time interval of arrival at the first parking location, wherein the item transfer control signal comprises the estimated time interval of arrival.

In some embodiments or in combination with any of the previous embodiments, the processing device is further configured to execute the computer-readable program code to: analyze the one or more items to determine an item weight of each of the one or more items; based on determining that the cumulative item weight of the one or more items is greater than a predetermined threshold, determine a return route for the vehicle to direct the vehicle from the first parking to a destination location such that a fuel efficiency of the vehicle along the return route is above a fuel efficiency threshold; and in response to determining that resource transfer from the user resource to the entity resource is successful, present the return route on the display of the vehicle.

In some embodiments or in combination with any of the previous embodiments, determining the travel vector trigger further comprises determining occupancy of the vehicle; and identifying that the travel vector trigger matches the geographic location parameter of the item entity further comprises (i) determining a packaging size of at least one item of the one or more items, and (ii) determining that the occupancy of the vehicle is below a predetermined threshold such that available space in the vehicle is greater than or equal to the packaging size.

In some embodiments or in combination with any of the previous embodiments, identifying that the travel vector trigger matches the geographic location parameter of the item entity further comprises determining that the vehicle is within a predetermined distance of the first parking location.

In some embodiments or in combination with any of the previous embodiments, identifying that the travel vector trigger matches the geographic location parameter of the item entity further comprises determining that a mobile device of the user and the vehicle are collocated.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
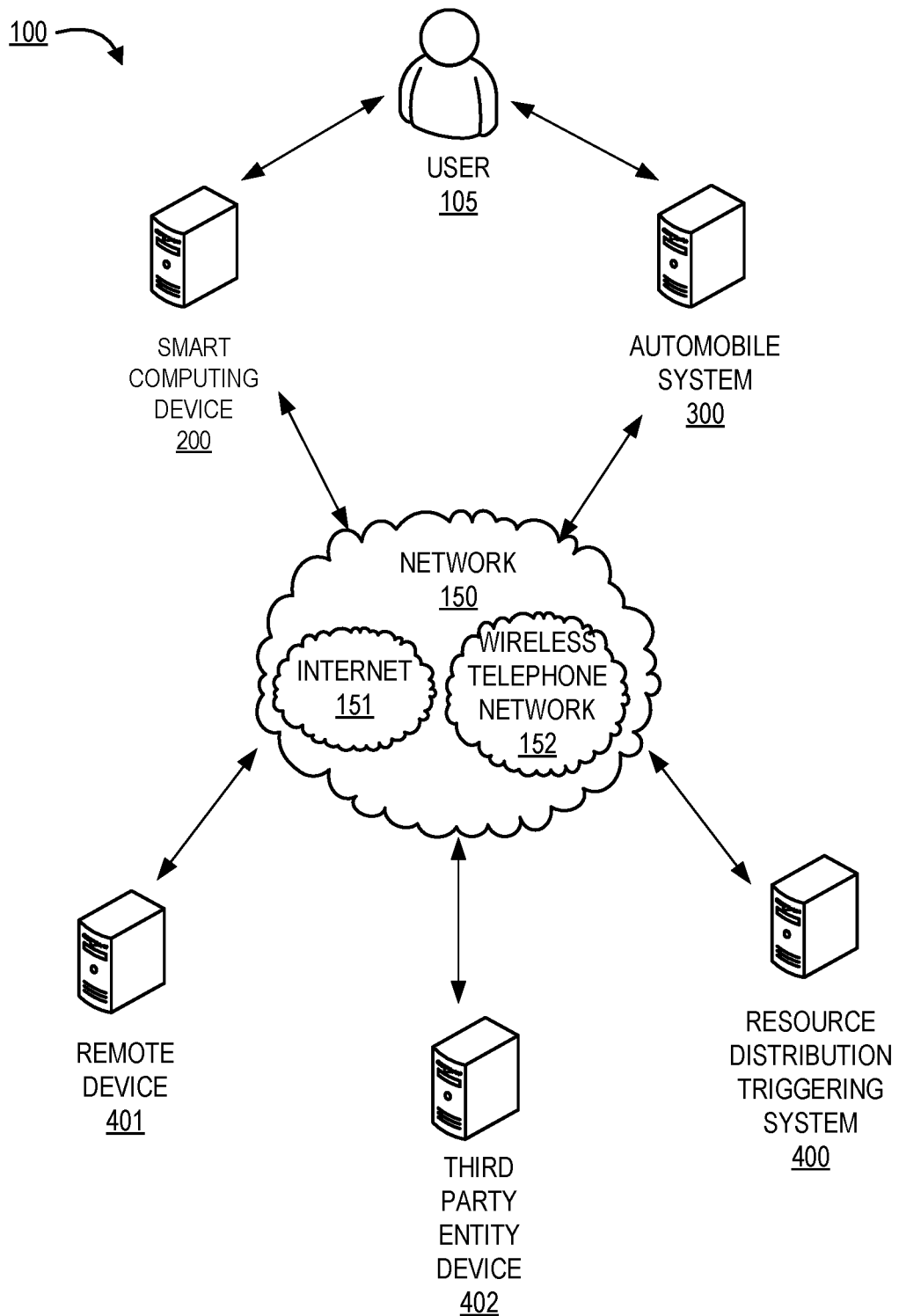
Figure 2:
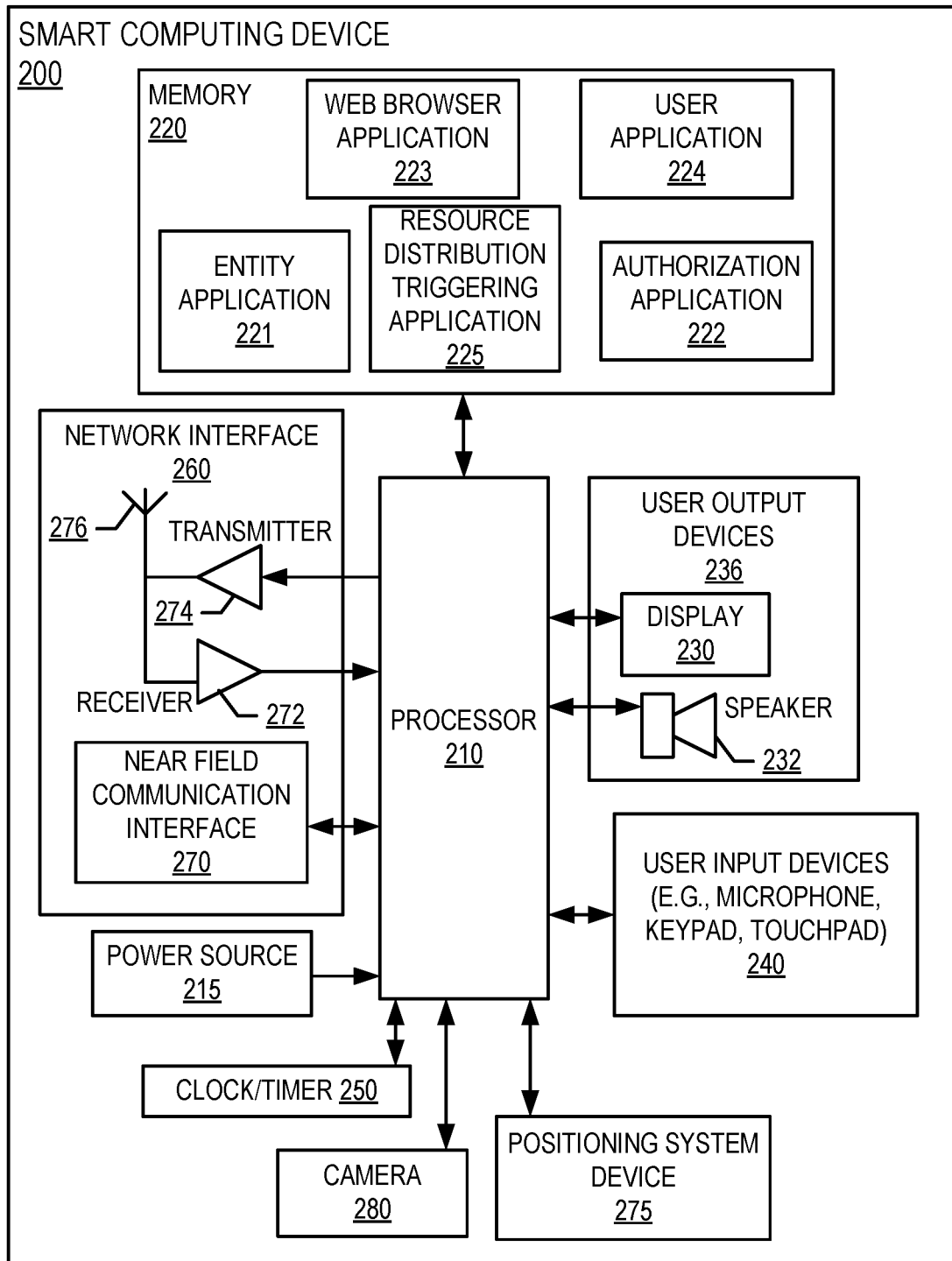
Figure 3:
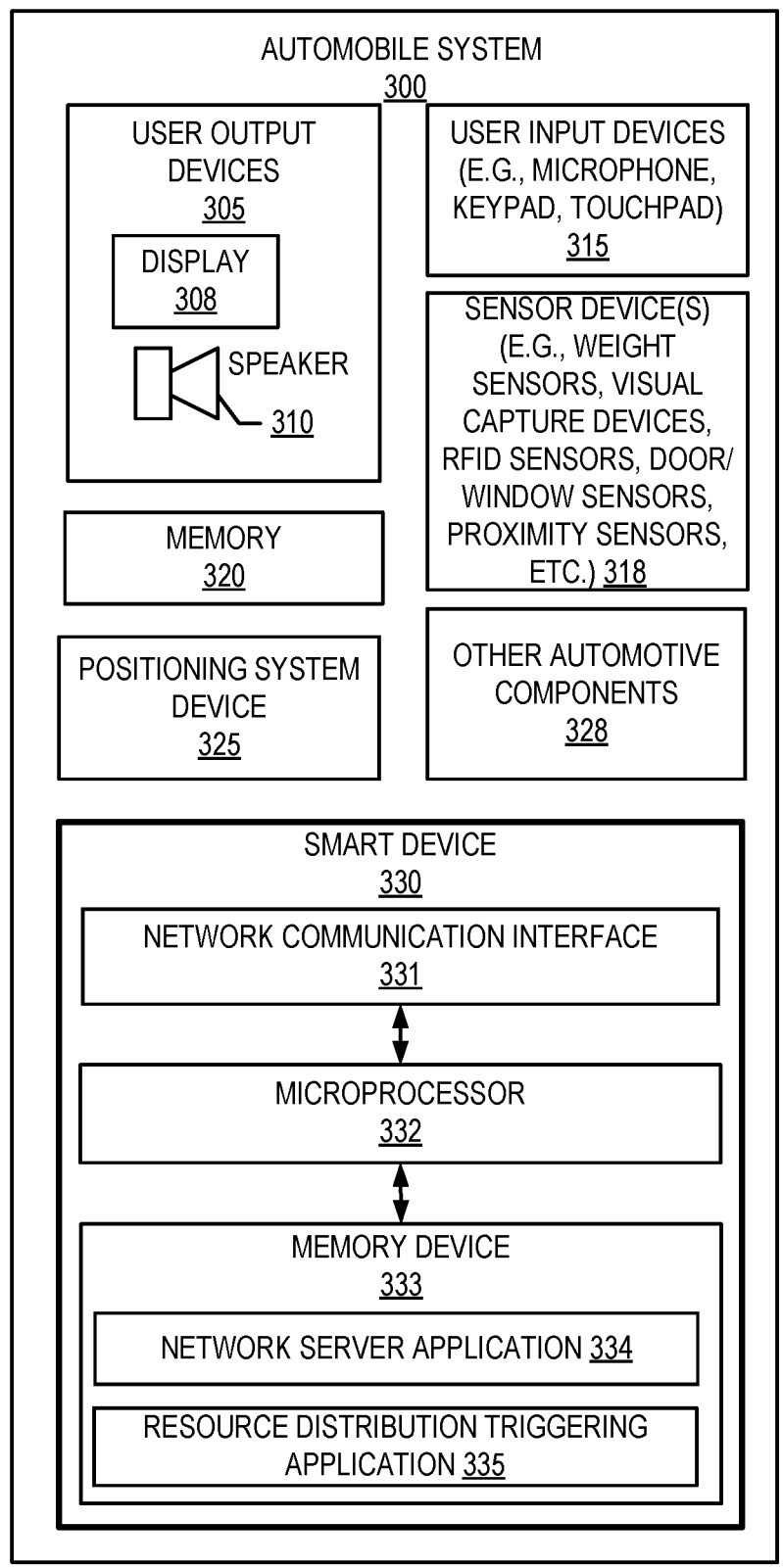
Figure 4:
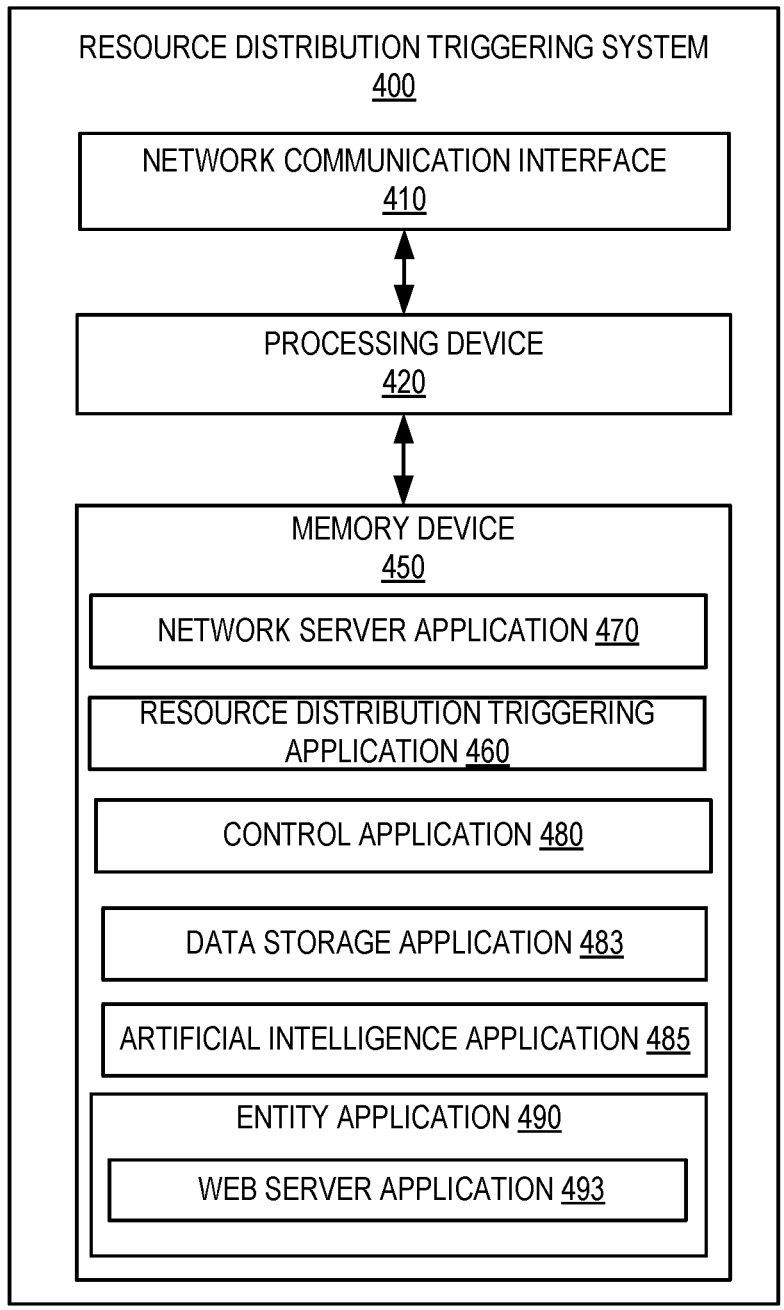
Figure 5:
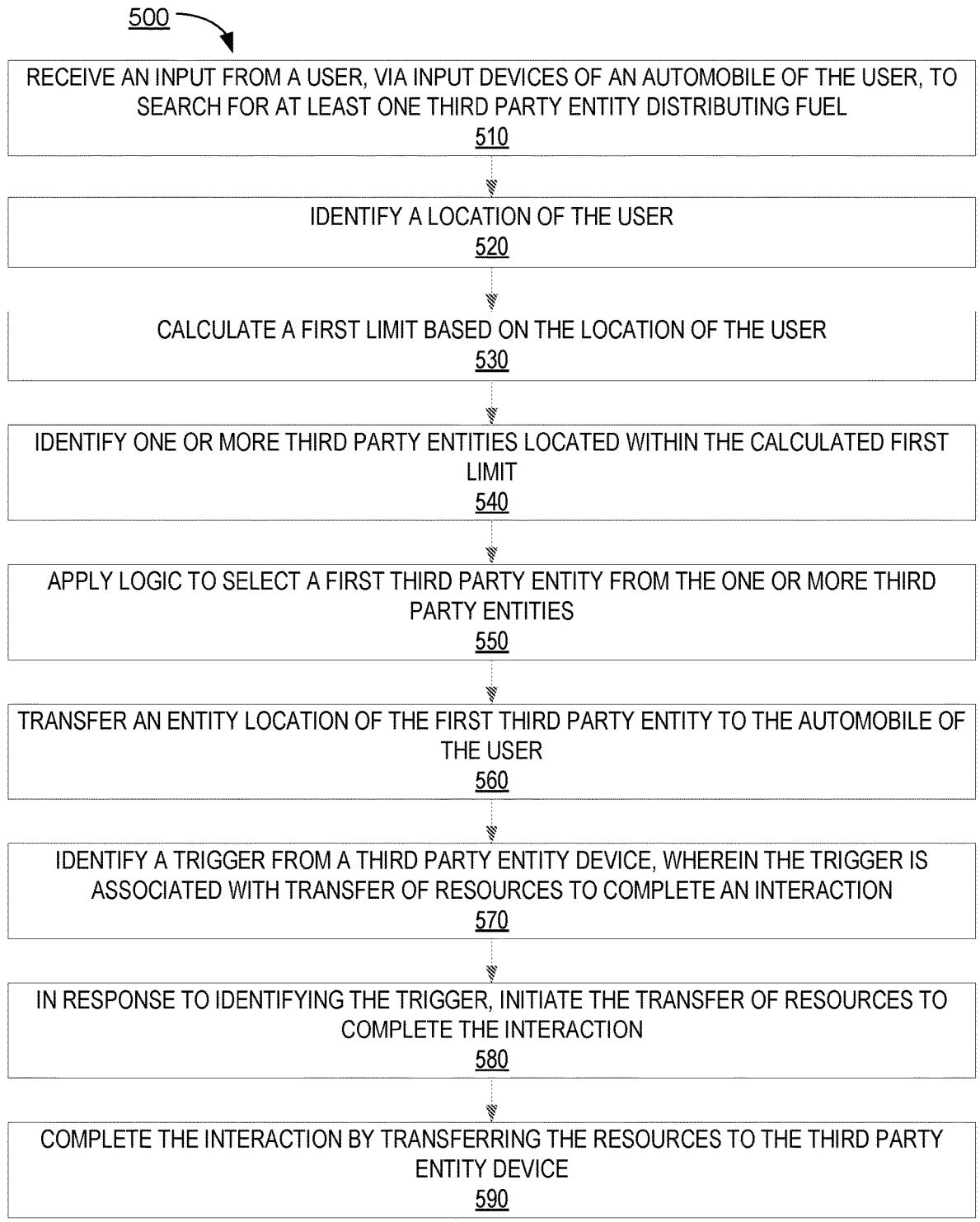
Figure 6:
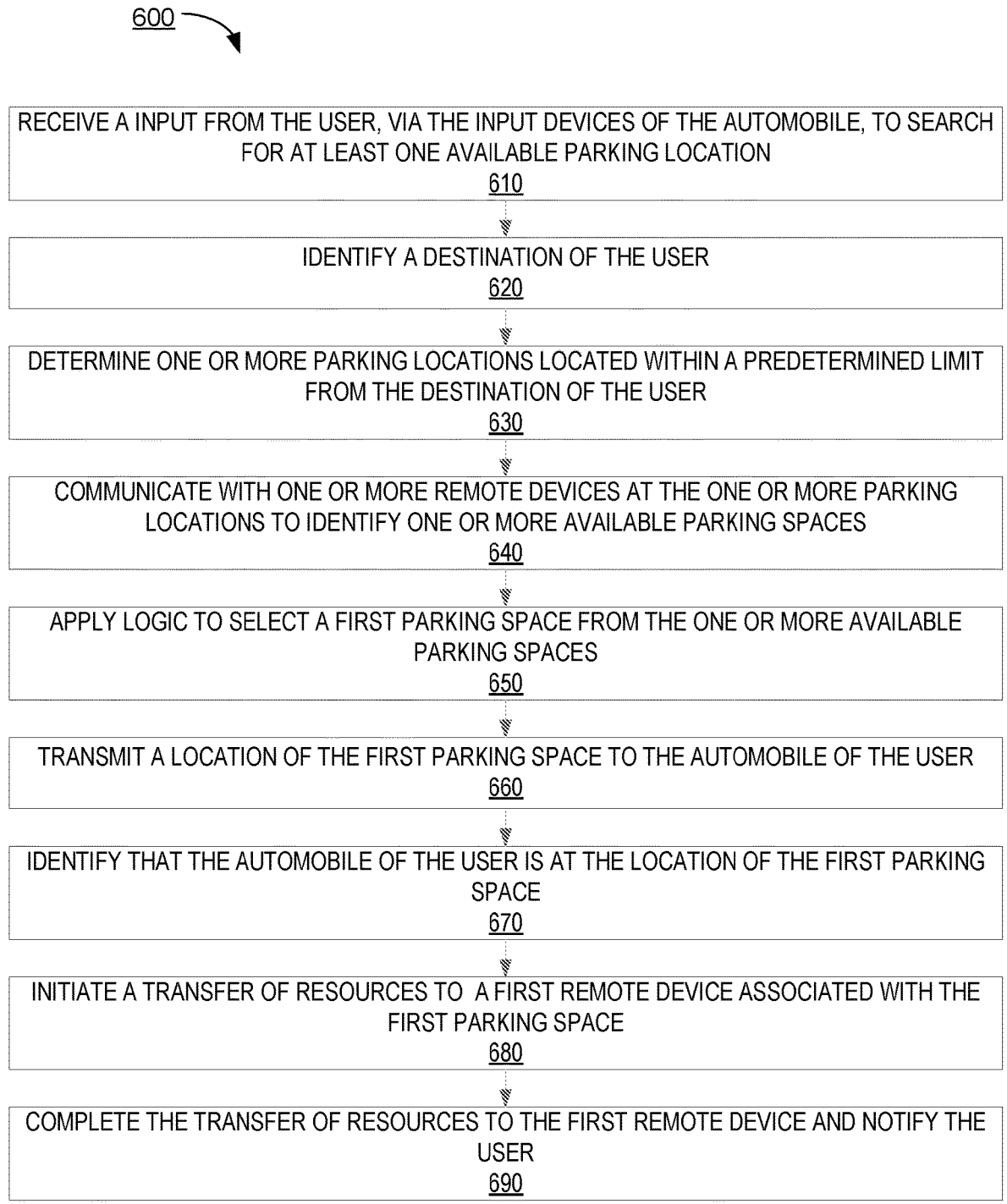
Figure 7:
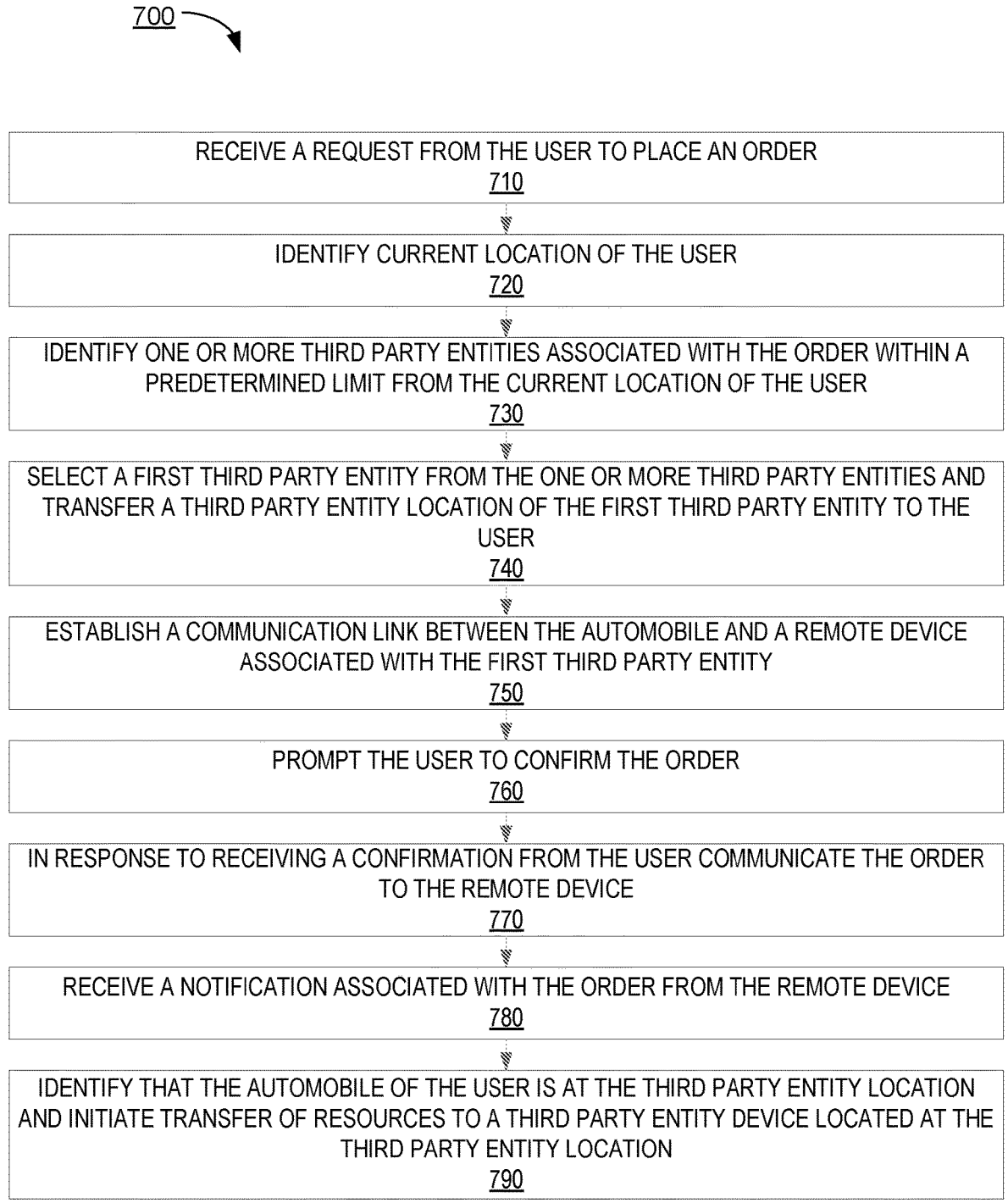
Figure 8:
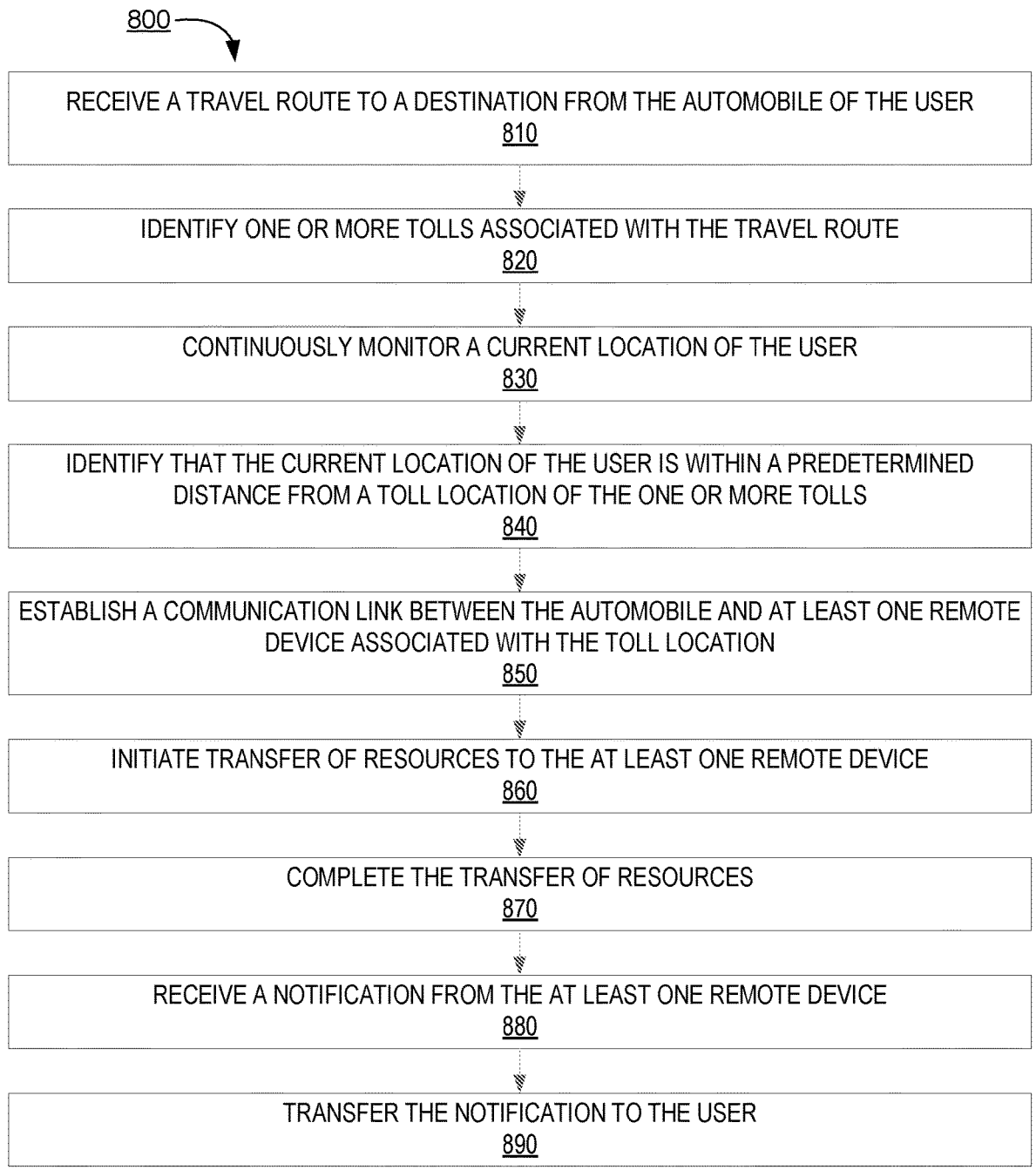
Figure 9:
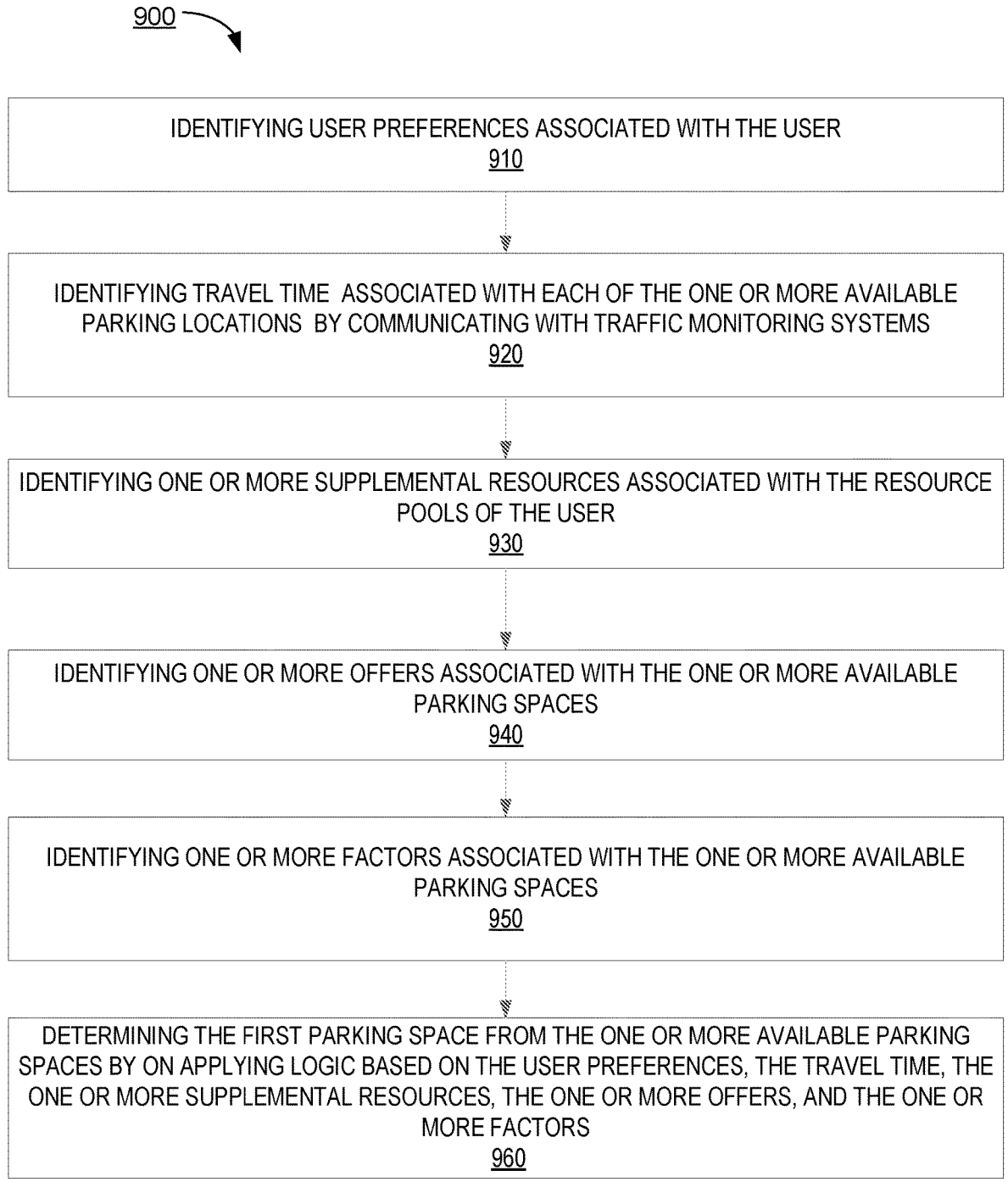

Having thus described embodiments of the invention in general terms, reference will be made to the accompanying drawings, where:

FIG. 1 presents an automobile resource distribution triggering system environment, in accordance with an embodiment of the present invention;

FIG. 2 presents a block diagram illustrating a smart computing device, in accordance with an embodiment of the present invention;

FIG. 3 presents a block diagram illustrating an automobile, in accordance with an embodiment of the present invention;

FIG. 4 presents a block diagram illustrating a resource distribution triggering system, in accordance with an embodiment of the present invention;

FIG. 5 presents a process flow for completing an interaction associated with fuel purchase via the automobile at a third party entity location, in accordance with an embodiment of the present invention;

FIG. 6 presents a process flow for completing an interaction associated with a parking location via the automobile, in accordance with an embodiment of the present invention;

FIG. 7 presents a process flow for communicating an order to a remote device of a third party entity via the automobile, in accordance with an embodiment of the present invention;

FIG. 8 presents a process flow for completing an interaction associated with one or more tolls by communicating with remote devices at toll booths via the automobile, in accordance with an embodiment of the present invention;

FIG. 9 presents a process flow for selecting a first third party entity from one or more third party entities associated with a parking location by applying logic via an artificial intelligence engine, in accordance with an embodiments of the present invention; and FIG. 10 presents a high level process flow for integrated connectivity of devices for resource transmission, in accordance with an embodiments of the present invention.

DETAILED DESCRIPTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

In some embodiments, a "financial institution" as used herein may include commercial banks, thrifts, federal and state savings banks, savings and loan associations, credit unions, investment companies, insurance companies and the like. In some embodiments, the financial institution may allow a customer to establish an account with the financial institution. An "account" or "resource pool" may be the relationship that the customer has with the financial institution. Examples of accounts include a deposit account, such as a transactional account (e.g. A banking account), a savings account, an investment account, a money market account, a time deposit, a demand deposit, a pre-paid account, a credit account, information associated with the customer, or the like. An account may be associated with and/or maintained by a financial institution.

An entity may be any person or organization. In some embodiments, the term "entity" or "third party entity" as used herein may be any merchant offering products or services to one or more users. This may include Quick Service Restaurants (QSR), gas stations, stores, merchants providing parking spaces, toll booths, convenience stores, pharmacy, wholesale merchants, event providers, operators of entertainment venues, and/or the like. The term "remote device" as used herein may be any computing device utilized by third party entities. The term "third party entity device" may be any computing device provided by third party entities at third party entity locations. This may include point of sale (POS) device provided by third party entities at any of the third party locations.

In some embodiments, a "user" may be a financial institution customer (e.g., an account holder or a person who have an account (e.g., banking account, credit account, or the like)). In some embodiments, a "user" may be a customer of a third party entity. In some embodiment, the user is an individual associated with a vehicle such as an automobile. In some embodiments, a user is an individual seeking to place and/or pick-up an order of items.

In accordance with embodiments of the invention, an "interaction" may be a transaction, transfer of funds, transfer of resources, and may refer to any activities or communication between a user and a financial institution, between a financial institution and a third party system, activities or communication between multiple financial institutions, communication between technology application and the like. Transfer of resources may refer to a payment, processing of funds, international transfer of funds, purchase of goods or services, a return of goods or services, a payment transaction, a credit transaction, or other interactions involving user's resource or account. Unless specifically limited by the context, a "transaction", a "transfer of funds", a "record" may refer to any activity initiated between a user and a financial institution or a third party system, or any combination thereof. Typical financial transactions include point of sale (POS) transactions, automated teller machine (ATM) transactions, person to person (p2p) transfers, internet transactions, online shopping, electronic funds transfers between accounts, transactions with a financial institution teller, personal electronic checks, conducting purchases using loyalty/reward points etc. When discussing the resource transfers or transactions are evaluated it could mean that the transactions have already occurred, are in the process of occurring or being processed, or they have yet to be processed/posted by one or more financial institutions.

A "system environment", as used herein, may refer to any information technology platform of an enterprise (e.g., a national or multi-national corporation) and may include a multitude of servers, machines, mainframes, personal computers, network devices, front and back end systems, database system and/or the like.

FIG. 1 provides a block diagram illustrating an automobile resource distribution triggering system environment 100. As depicted in FIG. 1, the operating environment 100 may include a resource distribution triggering system 400 interacting with a smart computing device 200 and automobile system 300 (e.g., vehicle system 300) of a user 105, one or more remote devices 401, one or more third party entity devices 402, using a network 150 that includes an internet 151 and wireless telephone network 152. In some embodiments, the resource distribution triggering system 400 may be maintained by a financial institution. In some embodiments, the resource distribution triggering system 400 may be owned and maintained by the financial institution. In some embodiments, the resource distribution triggering system 400 communicates with a financial institution system to complete one or more interactions and resource transfers. In some embodiments, the resource distribution triggering system 400 may be a part of a financial institution system (not shown) or a system operated by another entity. In alternate embodiments, the resource distribution triggering system 400 may be a part of the automobile system 300. In some embodiments, the resource distribution triggering system 400 may be part of a smart chip which is placed in the automobile system 300. In some embodiments, the resource distribution triggering system 400 may interact with smart computing devices and automobiles associated with a plurality of users (not shown) at any given instance. The user 105 and other plurality of users may be customers of the financial institution, item entities, or the third party entities.

The environment 100 also may include a plurality of computing devices of the user 105 and/or a plurality of networked devices of the user. The computing devices may include any machine, apparatus, system or the like that may be connected to and communicate with other devices over a network 150. The smart computing device 200 may include a personal computer such as a desktop computer, laptop computer, tablet or any type of personal computing device that may be connected to a network by landline or wireless access such as wireless local area network (WLAN) such as Wi-Fi based on the Institute of Electrical and Electronics Engineers' (IEEE) 802.11 standards, Bluetooth short-wavelength UHF radio waves in the ISM band from 2.4 to 2.485 GHz or other wireless access technology. The plurality of networked devices may include smart speakers, AI (artificial intelligence) devices, smart appliances (e.g., refrigerators, smart storage devices, cookware devices, lighting, etc.).

Referring now to FIG. 2, the smart computing device 200 may be any computing device utilized by the user 105. In embodiments of the present invention, the smart computing device may be any device of the user connected to the automobile of the user via a wired (e.g., USB port) or wireless technology (e.g., Bluetooth). The smart computing device may be any wearable device, laptop, mobile device, smart phone device, PDA, tablet, or any other mobile device. In one embodiment of the invention, there may be multiple smart computing devices, wherein the multiple smart computing devices may be a mobile telephone and a smart watch. Other types of smart computing devices 200 may include portable digital assistants (PDAs), pagers, tablets, mobile televisions, gaming devices, laptop computers, cameras, video recorders, audio/video player, radio, Global Positioning Systems (GPS) devices, or any combination of the aforementioned. In one embodiment of the present invention, the smart computing device 200 is a mobile device, such as a smartphone or cellular phone.

In some embodiments, the smart computing device 200 includes a processor 210 communicably/operatively coupled to such devices as a memory 220, user output devices 236, user input devices 240, and a network interface 260. The smart computing device 200 further includes a power source 215, such as a battery, for powering various circuits and other devices that are used to operate the smart computing device 200. Embodiments of the smart computing device 200 may also include a clock or other timer 250 configured to determine and, in some cases, communicate actual or relative time to the processor 210 or one or more other devices. The processor 210, and other processing devices described herein, generally include circuitry for implementing communication and/or logic functions of the associated device. For example, the processor 210 may include a digital signal processor device, a microprocessor device, and various analog to digital converters, digital to analog converters, and/or other support circuits. Control and signal processing functions of the smart computing device 200 are allocated between these devices according to their respective capabilities. The processor 210 thus may also include the functionality to encode and interleave messages and data prior to modulation and transmission. The processor 210 can additionally include an internal data modem. Further, the processor 210 may include functionality to operate one or more software programs, which may be stored in the memory 220. For example, the processor 210 may be capable of operating a connectivity program, such as a web browser application 223. The web browser application 223 may then allow the smart computing device 200 to transmit and receive web content, such as, for example, location-based content and/or other web page content, according to a Wireless Application Protocol (WAP), Hypertext Transfer Protocol (HTTP), and/or the like. The memory device 220 may include other applications such as financial institution application 221, a user application 224, resource distribution triggering application 225, authorization application 222, and/or the like. The user application 224 may be a digital wallet application or any application that maintains virtual cards which is provided by the financial institution system. In some embodiments, the resource distribution triggering application 225 may be a part of the financial institution application 221. In some embodiments, financial institution application 221 may be a mobile banking application. The resource distribution triggering application 225 interacts with the resource distribution triggering system 400 to perform one or more functions. In some embodiments, the authorization application 222 allows the smart computing device 200 to interact with financial institution systems and resource distribution triggering system 400. In some embodiments, the smart computing device may include a fitness tracking application, wherein the fitness tracking application comprises information associated with diet plans, calorie goals, and/or the like.

The processor 210 is configured to use the network interface 260 to communicate with one or more other devices on the network 150. In this regard, the network interface 260 includes an antenna 276 operatively coupled to a transmitter 274 and a receiver 272 (together a "transceiver"). The processor 210 is configured to provide signals to and receive signals from the transmitter 274 and receiver 272, respectively. The signals may include signaling information in accordance with the air interface standard of the applicable cellular system of the wireless telephone network 152. In this regard, the smart computing device 200 may be configured to operate with one or more air interface standards, communication protocols, modulation types, and access types. By way of illustration, the smart computing device 200 may be configured to operate in accordance with any of a number of first, second, third, and/or fourth-generation communication protocols and/or the like. For example, the smart computing device 200 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Consolidated Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 3GPP protocols and/or the like. The smart computing device 200 may also be configured to operate in accordance with non-cellular communication mechanisms, such as via a wireless local area network (WLAN) or other communication/data networks.

The network interface 260 may also include a near field communication (NFC) interface 270. As used herein, the phrase "NFC interface" generally refers to hardware and/or software that is configured to contactlessly and/or wirelessly send and/or receive information over relatively short ranges (e.g., within four inches, within three feet, within fifteen feet, and the like). The NFC interface 270 may include a smart card, key card, proximity card, Bluetooth® device, radio frequency identification (RFID) tag and/or reader, transmitter, receiver, and/or the like. In some embodiments, the NFC interface 270 communicates information via radio, infrared (IR), and/or optical transmissions. In some embodiments, the NFC interface 270 is configured to operate as an NFC transmitter and/or as an NFC receiver (e.g., an NFC reader). Also, it will be understood that the NFC interface 270 may be embedded, built, carried, and/or otherwise supported in and/or on the smart computing device 200. In some embodiments, the NFC interface 270 is not supported in and/or on the smart computing device 200, but the NFC interface 270 is otherwise operatively connected to the smart computing device 200 (e.g., where the NFC interface 270 is a peripheral device plugged into the smart computing device 200). Other apparatuses having NFC interfaces mentioned herein may be configured similarly. In some embodiments, the NFC interface 270 of the smart computing device 200 is configured to contactlessly and/or wirelessly communicate information to and/or from a corresponding NFC interface of another apparatus (e.g., a point of sale (POS) device, an automated teller machine (ATM) or another mobile or computing device). In one embodiment of the present invention, the NFC interface of the smart computing device 200 wirelessly communicates information (virtual card information such as virtual card number, CVV code, expiration date) stored in the user application 224 to perform a transaction.

As described above, the smart computing device 200 has a user interface that may be made up of user output devices 236 and/or user input devices 240. The user output devices 236 include a display 230 (e.g., a liquid crystal display or the like) and a speaker 232 or other audio device, which are operatively coupled to the processor 210. The user input devices 240, which allow the smart computing device 200 to transmit data, may include any of a number of devices allowing the smart computing device 200 to transmit data, such as a keypad, keyboard, touch-screen, touchpad, microphone, mouse, joystick, other pointer device, button, soft key, and/or other input device(s). The user interface may also include a camera 280, such as a digital camera.

The smart computing device 200 may also include a positioning system device 275 that is configured to be used by a positioning system to determine a location of the smart computing device 200. For example, the positioning system device 275 may include a GPS transceiver. In some embodiments, the positioning system device 275 is at least partially made up of the antenna 276, transmitter 274, and receiver 272 described above. For example, in one embodiment, triangulation of cellular signals may be used to identify the approximate location of the smart computing device 200. In other embodiments, the positioning system device 275 includes a proximity sensor or transmitter, such as an RFID tag, that can sense or be sensed by devices known to be located proximate a location to determine that the smart computing device 200 is located proximate these known devices.

The memory 220 is operatively coupled to the processor 210. As used herein, "memory" or "memory device" includes any computer readable medium (as defined herein below) configured to store data, code, or other information. The memory 220 may include volatile memory, such as volatile Random Access Memory (RAM) including a cache area for the temporary storage of data. The memory 220 may also include non-volatile memory, which can be embedded and/or may be removable. The non-volatile memory can additionally or alternatively include an electrically erasable programmable read-only memory (EEPROM), flash memory or the like. The memory 220 can store any of a number of applications which include computer-executable instructions/code executed by the processor 210 to implement the functions of the smart computing device 200 and/or one or more of the process/method steps described herein.

These applications also typically provide a graphical user interface (GUI) on the display 230 that allows the user 105 to communicate with the smart computing device 200, a financial institution system and/or other devices or systems. The memory 220 can also store any of a number of pieces of information, and data, used by the smart computing device 200 and the applications and devices that make up the smart computing device 200 or are in communication with the smart computing device 200 to implement the functions of the smart computing device 200 and/or the other systems described herein. For example, the memory 220 may include such data as user authentication information.

Referring now to FIG. 3, the automobile system 300 comprises one or more components of an automobile (e.g., a vehicle, a car, a truck, etc.). The automobile may be any wheeled motor vehicle comprising user output devices 305, user input devices 315, memory 320, positioning system device 325, other automotive components, and a smart device 330. In some embodiments, the smart device 330 may be a smart chip. The smart chip may be a micro device in the automobile. In embodiments of the invention, the smart chip 330 is provided the financial institution. The smart chip 330 may be integrated into any wheeled vehicles with user input and output devices. In some embodiments, the smart chip is maintained by the financial institution. As shown in the FIG. 3, the smart chip 330 may include a network communication interface 331, microprocessor 332, and memory device 333. The microprocessor 332 is configured to use the network communication interface 331 to communicate with one or more other devices on the network 150. In this regard, the network communication interface 331 may include an antenna operatively coupled to a transmitter and a receiver (together a "transceiver"). In some embodiments, the smart chip 330 may utilize a transceiver of the automobile. The microprocessor 332 is configured to provide signals to and receive signals from the transmitter and receiver, respectively. The smart chip 330 may utilize wireless network including satellite or any other wireless network of the automobile to provide signals and receive signals. In some embodiments, the smart chip 330 may utilize a wireless network of the smart computing device 200, which may be connected to the automobile system 300, to provide signals and receive signals to perform one or more steps in the process flows described below. The smart chip 330 may be configured to raise certain triggers and alert the resource distribution triggering system upon occurrence on any of one or more conditions. For example, the smart chip may identify an input from a user via any of the user input devices and may alert the system. In one example, the smart chip may identify that the user has entered a destination location via the user input devices and alerts the system to trigger processes.

The network communication interface 331 may also include a near field communication (NFC) interface. The NFC interface may include a smart card, key card, proximity card, Bluetooth® device, radio frequency identification (RFID) tag and/or reader, transmitter, receiver, and/or the like. In some embodiments, the NFC interface communicates information via radio, infrared (IR), and/or optical transmissions. In some embodiments, the NFC interface is configured to operate as an NFC transmitter and/or as an NFC receiver (e.g., an NFC reader). Also, it will be understood that the NFC interface may be embedded, built, carried, and/or otherwise supported in and/or on the smart device 330. In some embodiments, the NFC interface is not supported in and/or on the smart device 330, but the NFC interface is otherwise operatively connected to the smart device 330. For example, the smart computing device 200 may be connected to the network communication interface 331 of the automobile system 300 and may function as the NFC interface of the automobile system 300. In some embodiments, the NFC interface of the smart device 330 is configured to contactlessly and/or wirelessly communicate information to and/or from a corresponding NFC interface of another apparatus (e.g., a point of sale (POS) device, an automated teller machine (ATM) or another mobile, remote device, third party entity devices, or computing device). In one embodiment of the present invention, the NFC interface of the smart device 330 wirelessly communicates information (virtual card information such as virtual card number, CVV code, expiration date) stored in the memory 320 of the automobile or user application 224 of the smart computing device 200 to and/or from a corresponding NFC interface of a POS device to perform an interaction.

The memory device 333 may include one or more applications or information accessed or received by the smart chip 330. The memory device, as shown, comprises one or more applications including a network server application 334, resource distribution triggering application 335, and/or the like. The network server application 334 may be configured to cause the microprocessor to interact with other components of the automobile, smart computing device 200, resource distribution triggering system 400, remote device 401, third party entity device 402, and/or other device associated with the network 150. The resource distribution triggering application may be utilized to receive and communicate information to the resource distribution triggering system 400 to perform one or more steps in the process flow described herein. The smart chip 330 may receive instructions from the resource distribution triggering system to perform one or more steps described herein. In some embodiments, the smart chip 330 may receive information from the resource distribution triggering system 400, the third party entity device 402, or the remote device 401 and communicate the information to the user 105 utilizing the user output devices 305 including, but not limited to, display 308 and speaker 310 of the automobile 300. In some embodiments, the smart chip 330 may receive information from the user 105 via the user input devices including, but not limited to, microphone, keypad, touchpad, and/or the like of the automobile and communicate the information received form the user to the resource distribution triggering system 400, the third party entity device 402, or the remote device 401 to perform one or more steps in the process flows described herein. In some embodiments of the present invention, the smart chip 330 may identify current location of the automobile utilizing the positioning system device 325 of the automobile. The positioning system device may comprise one or more of GPS devices, proximity sensor devices, visual capture devices, beacons, transmitters, etc.

In some embodiments, the automobile system comprises sensor devices 318 that are configured to detect one or more vehicle parameters. The sensor device 318 may comprise one or more of weight sensors, visual capture devices, RFID sensors, door/window sensors, proximity sensors, actuator position sensors, engine sensors, fuel sensors, vehicle speed sensors, wheel speed sensors, and/or the like.

In some other embodiments, the smart chip 330 may utilize other automotive components 328 or information available in the other automotive components 328 of the automobile. The automotive components, may include any body and main parts (e.g., doors (passenger doors, cargo doors, storage compartment doors, etc.), windows, transmission systems, cruise control, gear box, axles, wheels, etc.) and/or their actuators, electrical and electronics (including navigation system, gauges and meters, sensors, electrical switches, cameras, audio/video devices, and/or the like), interior components (car seats, floor components, and/or the like), power train and chassis, and/or the like. In some embodiments, the automobile further comprises a chip reader to facilitate completion of one or more interactions. In some embodiments, the system comprises any other built in mechanism to facilitate completion of one or more interactions. In some embodiments, the built in mechanism and the chip reader may be provided by a financial institution. All or some components of the automobile described above may be considered as an automobile system.

FIG. 4 provides a block diagram illustrating the resource distribution triggering system 400, in greater detail, in accordance with embodiments of the invention. As illustrated in FIG. 4, in one embodiment of the invention, the resource distribution triggering system 400 includes one or more processing devices 420 operatively coupled to a network communication interface 410 and a memory device 450. In certain embodiments, the resource distribution triggering system 400 is operated by a financial institution, although the resource distribution triggering system 400 may be operated by another entity. In some embodiments, the resource distribution triggering system 400 is part of a system of the automobile system 300, wherein the resource distribution triggering system 400 may be embedded within any component of the automobile. In some embodiments of the invention, the resource distribution triggering system 400 is part of the smart chip 330, wherein the smart chip 330 is placed in the automobile and is a part of the automobile. In such an embodiment, the system establishes a direct communication link with the automobile system. In some embodiments, the resource distribution triggering system 400 may be an independent system, wherein the resource distribution triggering system 400 communicates with the automobile to performs one or more actions described in the process flows below via the smart chip 330 of the automobile. In such an embodiment, the system 400 establishes a communication link with the automobile system via the smart chip. For example, the system 400 may communicate with user input devices 315, positioning device 325, other automotive components 328, and user output devices 305 via the smart chip 330. In such embodiments, the system 400 may connect with the smart computing device 200 of the user via the smart chip 330, wherein the smart computing device 200 is present with the user and wherein the smart computing device 200 may be connected with the automobile system 300. In some embodiments, the smart computing device 200 may not be connected with the automobile system 300 via wired or wireless technology.

In one embodiment, the resource distribution triggering system 400 is part of a financial institution system. In such an embodiment, a resource distribution application performing the operations of the resource distribution triggering system 400 is stored in the entity system. In such embodiments, the smart chip may be configured to perform one or more steps of the process flows described herein and the resource distribution triggering system monitors and controls the smart chip and provides any additional information required to perform the one or more steps. In some embodiments, the resource distribution triggering system 400 may be a part of the smart chip 330 in the automobile.

It should be understood that the memory device 450 may include one or more applications and one or more databases or other data structures/repositories. The memory device 450 also includes computer-executable program code that instructs the processing device 420 to operate the network communication interface 410 to perform certain communication functions of the resource distribution triggering system 400 described herein. For example, in one embodiment of the resource distribution triggering system 400, the memory device 450 includes, but is not limited to, a network server application 470, a resource distribution triggering application 470, control application 480, a data storage application 483, artificial intelligence engine application 485 and other computer-executable instructions or other data. The computer-executable program code of the network server application 470, the resource distribution triggering application 470, the control application 480, and the data storage application 483, artificial intelligence engine application 485 may instruct the processing device 420 to perform certain logic, data-processing, and data-storing functions of the resource distribution triggering system 400 described herein, as well as communication functions of the resource distribution triggering system 400.

As used herein, a "communication interface" generally includes a modem, server, transceiver, and/or other device for communicating with other devices on a network. The network communication interface 410 is a communication interface having one or more communication devices configured to communicate with one or more other devices on the network 150, such as computing device 200. The processing device 420 is configured to use the network communication interface 410 to transmit and/or receive data and/or commands to and/or from the other devices connected to the network 150. The resource distribution triggering system 400, communicates with the smart chip 330 of the automobile to perform various steps described herein. The resource distribution triggering system 400, communicates with remote devices 401 and third party entity devices 402 to perform various steps described herein. In some embodiments, the resource distribution triggering system 400, communicates with other systems such as traffic monitoring system, entity system, authorization systems, and/or the like. The resource distribution triggering system 400 also comprises an artificial intelligence engine. In some embodiments herein, the resource distribution triggering system 400 is referred to as "the system" or the "system 400".

FIG. 5 presents a process flow 500 for completing an interaction associated with fuel purchase via the automobile at a third party entity location. As shown in block 510, the resource distribution triggering system 400 receives an input from the user 105 to search for at least one third party entity selling fuel. Fuel may be any of the available forms of fuel including, but not limited to, diesel, gas, electric, or the like. The input may be a voice command, a text command, and/or the like received from the user via the user input devices 315 of the automobile. The system instantly recognizes the input received from the user via the user input devices. In some embodiments, the system may identify that fuel in the automobile has dropped below a predetermined limit and automatically communicates a low fuel input to the system. In some embodiments, the system may communicate with other automobile components such as gauges or meters to identify that fuel in the automobile has dropped below a predetermined limit. For example, the predetermined limit may be 1 gallon in non-electric automobiles or 10 percent in electric automobiles. In some embodiments, the system may identify that the user is travelling to a destination and determine that refueling is required to reach the destination. The system then prompts the user, via the user output devices 305, to determine if the user would like to refuel. Upon receiving an input from the user, the system continues the process and proceeds to block 520.

As shown in block 520, the system then identifies, a current location of the user. The system communicates with the positioning system device 325 to identify the current location of the user and transfer it back to the system. In some embodiments, the system may connect with the smart computing device 200 such as mobile device and may utilize the positioning system device 275 to determine the current location of the user. In such embodiments, the smart computing device 200 may be connected with the automobile 300 via wired or wireless technology associated with the smart computing device 200. In some embodiments, the system may connect with the smart computing device 200 via the smart chip 330 in the automobile 300. In some embodiments, the system may use satellite data to determine the location of the user. The system along with identifying the current location of the user, determines the level of fuel in a gas tank of the automobile 300 by communicating with other automobile components 328 of the automobile 300. For example, the system may communicate with a system/component of the automobile 300 to retrieve fuel gauge data.

As shown in block 530, the system calculates a first limit based on the location of the user. The first limit is the maximum distance that the user can travel before running out of fuel based on the current location of the user and the level of fuel in the gas tank previously identified by the system. In other words, the maximum distance is based on the fuel consumption of the automobile. In some embodiments, the system may also identify the travel route and the destination of the user and communicate with traffic monitoring systems (not shown) to determine traffic in the travel route of the user. The system uses the current traffic information to calculate the first limit.

As shown in block 540, the system identifies the one or more third party entities located within the calculated first limit. The one or more third parties may be any merchants (e.g., gas stations) selling fuel located within the first limit from the current location of the user. The system identifies the one or more third parties along the travel route of the user.

As shown in block 550, the system applies logic to select a first third party entity from the one or more third party entities. For example, the system may identify that a merchant 'A' located at distance 'A' is selling fuel at a lower price than a merchant 'B' located at distance 'B' which is lower than distance 'A' at a price higher than the price offered by Merchant 'A.' In such an exemplary embodiment, the system considers the current traffic, user preferences (such as a particular gas station or a type of fuel available at the gas stations, and/or the like), and supplemental resources (rewards or cashback, membership perks, or any others) associated with the resource pool (credit account, debit account, or the like) of the user to select a merchant from the one or more merchants initially identified by the system. In some embodiments, the automobile 300 may be utilized by the one or more users. The system applies logic based on the user driving the car. The system identifies the user driving the car by communicating with the other automotive components of the automobile to identify driving patterns, weight of the user in the driver seat, driver seat preferences, or the like.

As shown in block 560, the system transfers an entity location of the first third party entity to the automobile. The system may automatically add the entity location to the selected travel route of the user via the navigation system of the automobile 300. In some embodiments, the system may add the entity location to the selected travel route of the user after receiving an approval from the user. In some embodiments, the system may identify a second third party entity from the one or more third party entities by applying logic based on receiving disapproval from the user and the system may add user's disapproval to the user preferences. In some embodiments, the system may store preferences associated with the user's disapproval in the memory of the automobile 300. In some embodiments, the system may store preferences associated with the user's disapproval in the memory of the smart chip 330. In some embodiments, the system upon adding the entity location to the selected travel route of the user, communicates with remote devices (e.g., fuel dispenser monitoring device) associated with the first third party entity to identify an empty refueling station and block the empty refueling station for the user. The system may receive a confirmation from the remote device about reserving the refueling station and may communicate the confirmation to the user via the user output devices of the automobile.

In some embodiments, the system may access one or more to-do lists of the user stored in the smart computing device of the user, and may identify that one or more products in the to-do list (e.g., grocery list) are available at the first third party entity location. The system may then communicate, after receiving an approval from the user, an order comprising one or more products in the to-do list to the third party devices (online ordering platform) associated with the first third party entity, wherein an employee of the first third party entity after receiving the order may fulfill the order before the user reaches the third party entity location. In some embodiments, the system may identify that the user purchased a set of products after refueling during the last visit and may prompt the user to identify if he/she would like to order same products before reaching the third party entity location.

The system after transferring the location of the first third party entity, continuously monitors a current location of the user, via the one or more components of the automobile and identifies that the current location of the user matches the location of the first third party entity. The system may then establish a communication link between the automobile system and a third party entity device (e.g., fuel dispenser or point of sale), at the location of the first third party entity. In some embodiments, the system establishes the communication link system between the automobile and a third party entity device by utilizing transmitting devices in the automobile and the third party entity device. In some embodiments, wherein the current location of the user matches the location of the first third party entity, the system may utilize the NFC interface in the automobile and the third party entity device to establish the communication link.

As shown in block 570, the system identifies a trigger from a third party entity device (e.g., fuel dispenser or point of sale), wherein the trigger is associated with transfer of resources to complete an interaction (transaction associated with fuel purchase). The trigger may be a payment request from the point of sale device, wherein the trigger comprises a unique identifier associated with the fuel purchase of the user. The system connects to the third party entity device (point of sale) using NFC interface to identify a resource amount (purchase amount).

As shown in block 580, the system in response to identifying the trigger, initiates the transfer of resources to complete the interaction. The system selects a best resource pool information from one or more resource pools of the user based on the supplemental resources offered (rewards, or the like). In some embodiments, the system accesses the resource pool information from the user application 224 (e.g., mobile wallet application or the like) in the smart computing device 200 connected to the automobile 300. In some embodiments, the system accesses the resource pool information from the memory of the automobile, wherein a system associated with the automobile, after identifying that the smart computing device is connected to the automobile 300 via wired or wireless technology, extracts the user resource pool information from the smart computing device 200 and stores it in the memory of the automobile 300. The system after identifying the best resource pool, authenticates the interaction i.e., transfer of resources by any forms of authentication methods. In one embodiment, the system verifies that one or more smart computing devices (mobile device, smart watch, or the like) of the user are within the proximity of the automobile and the third party entity device (point of sale). In another embodiment, the system may use facial recognition or finger printing or the like to authenticate the interaction. The system utilizes the wireless network of the automobile to transfer the best resource pool information to the third party entity device.

As shown in block 590, the system completes the interaction by transferring the resources to the third party entity device. The system transfers the resource amount from the identified best resource pool to the third party entity device. After completing the interaction, the third party entity device may transfer a receipt associated with the interaction to the automobile. At this time, the user need not wait at the third party entity location to receive the receipt. In an exemplary embodiment, after refueling the user may drive away from the third party entity location and the transfer of resources may be performed by the system without having the user to stay at the third party entity location. Similarly, the third party entity device may transfer a receipt while the user is not at the third party entity location. In some embodiments, the system may link or integrate the receipt into a user application or a financial institution application of the smart computing device 200. For example, upon completion of the transaction associated with the fuel purchase, the transaction may be posted into a resource pool (e.g., checking account) in the financial institution application (e.g., online application) on the mobile device 200. The system may integrate the receipt received from the third party entity device with the transaction posted in the resource pool via the financial institution application.

In some embodiments, the system may also transfer a second resource amount associated with the order placed before arriving at the third party entity location, thereby allowing the user to pick up the one or more products directly. In such embodiments, the system may utilize a card reader present in the automobile 300 to perform the interaction before arriving at the third party entity location. In some embodiments, the system after completion of transfer of second resource amount to the point of sale, receives a QR code or any other code from the third party entity device and transfers the received code to the one or more computing devices of the user. The user may provide this code at a pick-up location within the third party entity location to collect the one or more products of the order. In some embodiments, the system upon receiving an input from the user to search for Automated Teller Machines, may follow similar process to place an order at an Automated Teller Machine for withdrawing cash or the like and reserving the Automated Teller Machine for the user.

FIG. 6 presents a process flow 600 for completing an interaction associated with a parking location via the automobile. As shown in block 610, the system receives an input from the user, via the input devices of the automobile, to search for at least one available parking location. The input may be a voice command, a text command, and/or the like received from the user via the user input devices 315 of the automobile. The system instantly recognizes the input received from the user. In some embodiments, the system may identify current location of the user and based on the travel patterns may automatically identify that the user is searching for the at least one available parking location. In some embodiments, travel patterns may be stored in the memory of the automobile. In some embodiments, the travel patterns may be stored in the memory of the smart computing device. In other embodiments, the travel patterns may be stored in the memory of the system.

As shown in block 620, the system identifies a destination of the user. The system communicates with the navigation system of the automobile to identify the destination of the user. In alternate embodiments, the system may automatically identify the destination based on the travel patterns of the user. As shown in block 630, the system determines one or more parking locations located within a predetermined limit from the destination of the user. For example, the system may identify all parking locations within half a mile from the destination. As shown in block 640, the system communicates with one or more remote devices at the one or more parking locations to identify one or more available parking spaces. For example, the system communicates with parking meter monitoring systems to identify one or more available parking spaces within each of the one or more parking locations. Additionally, the system may also identify the exact location of each of the one or more available parking spaces.

As shown in block 650, the system applies logic to select a first parking space from the one or more available parking spaces. FIG. 9 presents a process flow 900 for selecting a first third party entity from one or more third party entities associated with a parking location by applying logic via an artificial intelligence engine, in accordance with embodiments of the present invention. As shown in block 910, the system identifies user preferences associated with the user. For example, the user may prefer a particular parking space, a particular parking location, a left side parking space, a right side parking space, a parking space with adjacent empty parking spaces, or the like. The user preferences may be stored in the memory of the smart computing device 200 or the memory of the automobile 300. The system retrieves user preference data and identifies that the user prefers parking space 'A' which is closer to elevator over parking space 'B' which is away from the elevator. In another case, the system retrieves user preference data and identifies that the user prefers going to parking location or parking entity 'A' over parking location or parking entity 'B'. As shown in block 920, the system identifies travel time associated with each of the one or more parking locations by communicating with traffic monitoring systems (not shown). For example, the system may identify that traffic associated with the travel route to go to parking location 'A' is less than the travel route associated with parking location 'B' of the one or more parking locations. Additionally, the system may also identify the travel distance to each of the identified one or more parking locations. As shown in block 930, the system identifies one or more supplemental resources associated with the resource pools of the user. Supplemental resources may be any of rewards, cashback, membership perks, associated with any of the resource pools of the user. For example, the system may identify that resource pool 'A' has a cashback deal with merchant of the parking location 'A' of the one or more parking locations. In some embodiments, the system may access supplemental resource information associated with resource pools of the user by accessing the user application 224 or financial institution application 221 of the smart computing device 200. In some embodiments, the system may access supplemental resource information by communicating with entity system associated with the resource pools. As shown in block 940, the system identifies one or more factors received from the entities associated with the identified one or more parking locations. For example, after identifying the one or more available parking spots in the one or more parking locations in block 640, may notify the entities about a potential opportunity (purchase of a parking spot). The entities may send one or more offers to the system in response to receiving a notification with the potential opportunity. The system may identify the one or more offers and may identify that entity 'A' is offering parking space for a lower price compared with other entities of the entities associated with one or more parking locations. In some embodiments, wherein the price of the available parking spaces is fixed, the system may identify the entity offering the lowest prices by communicating with systems associated with the entities. Next, as shown in block 950, the system identifies one or more factors associated with the one or more available parking spaces at the one or more parking locations. For example, the system may identify that a parking space 'A' at parking location 'A' is closer to the elevator of all the one or more available parking spaces. Next, as shown in block 960, the system determines the first parking space from the one or more available parking spaces by applying logic based on the user preferences, travel time, the one or more supplemental resources, and the one or more offers received from the entities, and the one or more factors. The system may apply logic based on the current traffic near each of the one or more parking locations, distance between the elevator or stairs and the exact location of each of the one or more available parking spaces, pricing of the one or more available parking spaces, offers associated with the one or more available parking spaces, user preferences, one or more to-do lists, and/or the like. For example, the system may access one or more to-do lists of the user stored in the smart computing device (smart watch, mobile device, or the like) of the user and may identify that the user has "pick up clothes from dry cleaners" listed in the to-do list of the user and the system considers a parking space available closer to the dry cleaners.

As shown in block 660, the system transmits a location of the first parking space to the user via the output devices of the automobile. The system automatically adds the location of the first parking space as the destination, via the navigational system of the automobile. In some embodiments, the system may add the location to the destination after receiving an approval from the user. The system upon adding the location to the destination, communicates with remote devices (parking meter monitoring system) associated with the first parking space to reserve the first parking space for the user.

As shown in block 670, the system identifies that the automobile of the user is at the location of the first parking space by continuously monitoring the current location of the user. The system identifies that the user has reached the parking space by identifying the current location of the user. After identifying that the user has reached the location of the first parking space, the system establishes a communication link between the automobile system and a first remote device (parking system, parking meter, or the like). In some embodiments, the system may establish the communication link between the automobile system and the first remote device when the current location of the user does not exactly match the location of the first parking space. In such an embodiment, the system allows the user to block the first parking space via the communication link between the automobile system and the first remote device. In one embodiment, wherein blocking the first parking space is not allowed, the system continuously monitors the first parking space. The system may identify that the first parking space is no longer available and may choose a second parking space by applying logic as explained in process flow 900. As shown in block 680, the system initiates a transfer of resources to the first remote device associated with the first parking space. The system selects a best resource pool information from one or more resource pools of the user based on the supplemental resources offered (rewards, or the like). The system after identifying the best resource pool, authenticates the interaction i.e., transfer of resources by any forms of authentication methods. In one embodiment, the system verifies that one or more smart computing devices (mobile device, smart watch, or the like) of the user are within the proximity of the automobile and the first parking space. In another embodiment, the system may use facial recognition or finger printing or the like to authenticate the interaction.

In an exemplary embodiment, a parking meter may not be available on every floor at all parking locations. The system connects with the parking meters remotely after identifying that the automobile of the user is at the location of the first parking space and initiates transfer of resources (parking fare) to the parking meter located on another floor at the parking location. As shown in block 690, the system completes the transfer of resources to the first remote device and notifies the user. In some embodiments, the system may utilize the chip reader in the automobile for completing the interaction. After completion of transfer of resources, the system may receive a receipt from the remote device i.e., the parking meter. The system may automatically save the receipt in the memory of automobile, smart chip, and/or the smart computing devices of the user. In some embodiments, the system may link or integrate the receipt into a user application or a financial institution application of the smart computing device 200. For example, upon completion of the transaction associated with the first parking space, the transaction may be posted into a resource pool (e.g., checking account) financial institution application (e.g., online application) on the mobile device 200. The system may integrate the receipt received from the first remote device with the transaction posted in the resource pool via the financial institution application. In some embodiments, the system receives the receipt immediately upon completion of the interaction.

In some embodiments, the pricing associated with the first parking space may be hourly pricing. In such embodiments, the system may identify a resource amount associated with the first parking space when the user is leaving the location associated with the first parking space. The system may utilize the communication link established between the automobile system and the first remote device to transfer the resource amount to the first remote device. In some embodiments, the transfer of resources may occur when the real-time location of the user does not match the location of the first parking space, thereby allowing the user to pay without having to wait the parking location or the first parking space.

FIG. 7 presents a process flow 700 for communicating an order to a remote device of a third party entity via the automobile. As shown in block 710, the system receives a request from the user, via the input devices of the automobile, to place an order. The order may be a fast food order, a prescription refill order or the like which involves picking up one or more products associated with the order at a drive-through. The order may be received as an input from the user. The input may be a voice command, a text command, and/or the like received from the user via the user input devices 315 of the automobile.

Based on the user input, the system finalizes the order and may look for one or more third party entities providing one or more products in the finalized order. Additionally, the system may also communicate with a budgeting application of the smart computing device 200 and may alert the user of spending goals. For example, the system may identify that the prices of the current order may exceed the spending goals set by the user and may notify the user via the output devices of the automobile 300.

As shown in block 720, the system identifies current location of the user. The system communicates with the positioning system device 325 to identify the current location of the user. In some embodiments, the system may use satellite data to determine the location of the user. Additionally, the system may also identify a destination, via the navigation system of the automobile 300. As shown in block 730, the system identifies one or more third party entities associated with the order within a predetermined limit from the current location of the user. For example, the system identifies one or more third parties within five miles from the current location of the user. In some embodiments, the predetermined limit may be fixed. In some embodiments, the predetermined limit may be dynamic. For example, the system may choose the predetermined limit based on a time estimate for the order to be ready. In some embodiments, the system may estimate a time required to prepare one or more products associated with the order based on time of the day. For example, if the order is a fast food order and the user sends a request to place an order during lunch hour, the system may estimate that the order may take more amount of time than the usual time taken to prepare one or more products. In other words, the system intelligently identifies the predetermined limit, therefore allowing the user to pick up the order at a drive-through without having to wait for the order. The system identifies one or more third parties between the current location and destination and along the travel route selected by the user, that are offering the one or more products associated with the request.

As shown in block 740, the system selects a first third party entity from the one or more third party entities and transfers a third party entity location of the first third party entity to the user. The system, via the artificial intelligence engine, applies logic to select the first third party by considering one or more factors such as rating of the one or more third party entities, user preferences, supplemental resources associated with the one or more third party entities, current traffic, detour distance, or the like. As shown in block 750, the system establishes a communication link between the automobile system and a remote device (online ordering platform) associated with the first third party entity. The system communicates with the remote device to open a new order ticket.

As shown in block 760, the system prompts the user to confirm the order, via the output devices of the automobile. For example, the system may read the order to the user via the speaker. In some embodiments, when the order is a fast food order, the system identify that the user ordered additional condiments in a previous order similar to the present order based on the past ordering history. The system may also read out the additional condiments placed in the previous order to the user and may prompt the user to confirm the additional condiments to be requested along with the order.

As shown in block 770, the system in response to receiving a confirmation from the user, via the input devices of the automobile, communicates the order to the remote device. The system may add the one or more products and additional condiments to the new ticket opened by the system by communicating with the remote device. The system may additionally calculate estimated arrival time of the user based on the traffic, current location, driving patterns, or the like and may communicate the calculated estimated arrival time of the user to the remote device.

As shown in block 780, the system receives a notification associated with the order from the remote device. The notification may include an resource amount i.e., total cost of the order, order confirmation, a confirmation code (e.g., QR code), drive-through slot number, order status tracking link, or the like. The system may then automatically initiate transfer of resources to the remote device the wireless network of the automobile to the remote device. In some embodiments, the system may utilize the chip reader in the automobile to transfer the resources directly to the remote device via the communication link established between the automobile system and the remote device. In some embodiments, the system may cause the financial institution application (e.g., online banking application) or user application (e.g., digital wallet) on the smart computing device to transfer the resources to the remote device. In one such embodiment, the system may utilize the card reader to transfer the resources. In alternate embodiments, as shown in block 790, the system identifies that the automobile of the user is at the third party entity location and initiates transfer of resources via the NFC interface to a third party entity device located at the third party entity location. For example, the system may identify that the user is at the drive-through slot number associated with the user and may establish a communication link via the NFC interface of the automobile with a point of sale device at the drive-through slot and may communicate the confirmation code to the point of sale device. The system may access the user application (e.g., digital wallet application) and choose a best resource pool from the one or more resource pools associated with the user may transfer the resources associated with the resource amount from the best resource pool to the point of sale device. In some embodiments, in response to transferring the resources, the third party entity device may transmit a receipt to the user. The system may then integrate the receipt with a corresponding transaction posted in the resource pool of the user via the financial institution application or user application in the smart computing device 200.

FIG. 8 presents a process flow 800 for process flow for completing an interaction associated with one or more tolls by communicating with remote devices at toll booths via the automobile. As shown in block 810, the system receives a travel route to a destination from the user, via the input devices of the automobile. The user may input a destination into the navigation system of the automobile and select a travel route associated with the destination. The system identifies that the user selected the travel route. In some embodiments, the system may automatically select a best travel route based on the traffic conditions, road closure, and/or the like. As shown in block 820, the system identifies one or more tolls associated with the travel route. In some embodiments, the system may identify one or more tolls by communicating with navigation systems of the automobile. In some embodiments, the system may identify the one or more tolls by communicating with remote navigation systems. Alternatively, the system may identify one or more tolls by communicating with user application (navigation application) of the mobile device.

As shown in block 830, the system continuously monitors a current location of the user. In some embodiments, the system monitors the current location of the user via the positioning system device 325 of the automobile 300. In alternate embodiments, the system monitors the current location of the user via the positioning system device 275 of the smart computing device 200. Additionally, the system may also current traffic conditions along the travel route by communicating with the traffic monitoring systems.

As shown in block 840, the system identifies that the current location of the user is within a predetermined distance from a toll location of the one or more tolls. In some embodiments, the predetermined distance may be set by the user. For example, the system identifies that the current location is two miles away from the next toll booth in the travel route. In some embodiments, the system based on the current traffic conditions and calculates a new predetermined distance based on the current traffic conditions. For example, if the travel time to the next toll booth is thirty minutes and the travel distance is two miles, the system calculates a new predetermined limit which may be quarter mile from the next toll booth. Therefore, by calculating the new predetermined limit, the system may avoid paying for unnecessary tolls in instances when there is a traffic diversion.

As shown in block 850, the system establishes a communication link between the automobile system and at least one remote device such as online toll payment platform associated with the toll location. For example, the system establishes a communication link and the wireless network of the automobile. The system, via the communication link identifies a resource amount associated with the toll. Alternatively, in some embodiments, the system may identify the resource amount by communicating with any toll calculator systems. In some embodiments, the system may identify the resource amount by communicating with user applications (toll calculator) in the smart computing device 200.

As shown in block 860, the system initiates transfer of resources to the at least one remote device. The system selects a best resource pool information from one or more resource pools of the user based on the supplemental resources offered (rewards, or the like). The system after identifying the best resource pool, transfers the resource associated with the resource amount to the at least one remote device. As shown in block 870, the system completes the transfer of resources. In some embodiments, the system utilizes the chip reader in the automobile to complete the transfer of resources.

As shown in block 880, the system receives a notification from the remote device. The notification may include a payment confirmation, a toll lane number, or the like. As shown in block 890, the system transfers the notification to the user via the output devices of the automobile. For example, the system may read the toll lane number associated with the notification received from the at least one remote device via the speaker of the automobile. Additionally, the system may also receive a receipt associated with the interaction from the remote device. The system may integrate the receipt with the interaction posted to the resource pools via the financial institution application or user application in the smart computing device.

FIG. 10 depicts a high level process flow 1000 for integrated connectivity of devices for resource transmission. The steps of the method 1000 are described herein as being performed by the resource distribution triggering system 400, but it is within the scope of the present invention for the steps of the method 1000 to be performed by other systems (e.g., based on control signals from the system 400) and/or devices described herein.

Initially, the system identifies one or more items that the user may require within a predetermined succeeding time interval (e.g., within the next week, within the next 20 days, within the next 3-4 days, etc.), and more specifically one or more items that the user may seek to order at an entity (e.g., a merchant) and pick-up at the entity geographic location (e.g., store) using a vehicle (i.e., automobile system 300) associated with the user. In some embodiments, the one or more items are typically items that the user may be interested in purchasing.

In some embodiments, the system identifies the one or more items based on user information, such as historical user activities. The system may determine historical user activities based on analyzing and/or monitoring one or more electronic accounts of the user, such as an email account, social media account, and/or electronic calendar account. The system may determine historical user activities based on analyzing and/or monitoring one or more resource accounts of the user, such as financial accounts, checking accounts, credit card purchases, etc. In this regard, the user may grant the system 400 with access to the user's accounts (e.g., electronic accounts, financial accounts, etc.) by providing the system 400 with the user's credentials for accessing such accounts. Thereafter, the system 400 may monitor (e.g., continuously or periodically) such accounts (e.g., electronic accounts, financial accounts, etc.) to identify user activities and the associated items. These user activities may involve purchase, earmarking, reserving, tagging, setting aside, allocating or associating one or more historical items by the user. The system 400 may also identify entries in an electronic calendar that relate to one or more items or entity locations associated with items. The system 400 may search the header, subject line and/or titles of electronic messages and/or calendar entries for key words (e.g., "purchase", "order", "ticket", "receipt", "invitation", and the like) that may relate to an item. If the system 400 determines from this initial analysis that an electronic message or calendar entry may relate to an item, then system 400 then typically accesses the body of such electronic message or calendar entry to confirm that such electronic message or calendar entry relates to an event associated with an item/entity location/area/locality associated with the item. In addition, the system 400 typically parses the electronic message or calendar entry to extract item information (e.g., item SKU, item type, entity location/store, date and time of the purchase, parking information, information about a parking pass of the user, and the like).

Because the text contained in email message or calendar entry bodies is often unstructured (as opposed to the structured tagged elements in a hypertext markup language (HTML) web page which delineate and make recognizable the various fields or elements of the web page), item information may be converted from an unstructured to a structured format. In one embodiment, predefined templates are used that have been specifically created to identify the various individual data elements of interest in a given email from an entity. In some embodiments, context-free grammars "CFGs" are used for parsing relevant item information. In some embodiments, instead of using grammars for parsing natural language (e.g., English) structures, the system 400 may use defined smaller grammars describing a particular message format, for example: "(Greetings from entity)(Details about order)(Details about item)(Tax and totals calculation)," and the like. Further, the CFGs may be individually defined, such as in a Backus-Naur Form (BNF) format, or templates may be used for data extraction. In instances, where templates are used, these created templates are grammar and can be converted by known tools, such as Another Tool for Language Recognition "ANTLR", into email-specific grammars. ANTLR is then used again to convert these grammars into extraction parsers, which can be used by the system 400 to parse the email message bodies, calendar entries, etc. To extract the data elements of interest from them. Other extraction parsers may be used, such as regular expression extraction, which can be used as a brute force pattern matching approach. With this technique, each word in a given email or calendar entry is matched against a set of rules. If the rules are met, the piece of text matching the set of rules is returned. In another embodiment, an HTML document object model (DOM) approach may be used to parse item information. For example, the message body of an email may contain HTML code with tags for order and item information. The system 400 may use these tags to identify item information for extraction. Once the item information has been extracted and converted to a structured format, the structured item information is typically stored in a database in communication with the system 400.

In some embodiments, the system 400 may identify a plurality of, periodic or intermittent, electronic messages, receipts, social media updates, a plurality of networked devices associated with the user (e.g., current user appliance information, user smart devices, smart speakers, internet of things (IoT) devices, etc.) and/or the like, that relate to multiple purchases of a first historical item by the user. In response, the system may identify a purchase pattern for the first historical item, i.e., a purchase pattern comprising the purchase of the first historical item from a first entity location (e.g., store) at a frequency of an average first time interval. Next, the system may identify a most recent purchase of the first item and subsequently determine a current time lag (e.g., duration between the time of the most recent purchase of the first item and a current time) since the most recent purchase of the first item. In some embodiments, the system may determine the first historical item as the one or more items to the dynamic item file, based on determining that the current time lag is greater than or equal to the average first time interval.

In some embodiments, the system may determine the first historical item as the one or more items to the dynamic item file, based on determining that the current time lag is greater than or equal to an adjusted average first time interval with a predetermined tolerance. The adjusted average first time is determined by modifying the average first time interval with a predetermined tolerance factor. The predetermined tolerance factor may be time until the next scheduled user visit to the first entity location or a location within a predetermined proximity of the first entity location, seasonal/weather patterns, estimated travel time for the user to visit the first entity location, purchases of auxiliary users associated with the user (e.g., the user's spouse), current availability of the first historical item at the user's home/office, and/or the like. For instance, the system may identify that the first historical item is a seasonal item (i.e., the item is typically only available between a first month to a second month, in a year) or that the user only purchases the first historical item during a time interval of a first month to a second month, in a year. Here, the system may determine a predetermined tolerance factor of the duration between the current time and the first month, and subsequently determine the adjusted average first time interval as being the sum of the average first time interval and the predetermined tolerance factor. As another instance, the system may retrieve current information from a plurality of networked devices (e.g., smart appliances, other IoT devices associated with the user) and determine that one or more of the first historical items are currently available/present at a user location (e.g., identify that 4 of the first historical items are currently present in a smart refrigerator based on activating cameras/visual capture devices of the smart refrigerator, or identify that the first historical item is present in a user's closet based on an RFID detector of the closet). Based on the one or more of the first historical items that are currently available/present at a user location, the system may determine a predetermined tolerance factor of a certain number of days, and subsequently determine the adjusted average first time interval.

In some embodiments, the system identifies one or more items from products on a user's shopping list. In some embodiments of the invention, identifying items, i.e., products, comprises receiving a request to add items to a user's dynamic item file (e.g., a virtual shopping list). For example, the user may add an item to the dynamic item file by capturing product identifiers of items using a camera 280 or the user input devices 240, as previously described. In some embodiments of the invention, the camera 280 is used to capture an image of a product identifier and the user may then upload the image to a social media account of the user. The system may then analyze the image (e.g., the image stored on the user device 200, the image uploaded to the social media account, or publically accessible social media image of the user, etc.) to determine information about the item. In some embodiments of the invention, the user may input one or more items using a user input device 240, such as a touchscreen. The user may access a shopping application on the user device 200 in order to add an item to a shopping list.

At block 1010, the system is configured to construct a dynamic item file for a user based on the identified one or more items. The dynamic item file comprises one or more items associated with the user. In some embodiments, the dynamic item file is in the form of a linked list comprising memory locations for each of the one or more items, to facilitate real-time addition and modification of items. In some embodiments, the dynamic item file is in the form of a database. In some embodiments, the system may sort the items into one or more dynamic item files based on various attributes, such as but not limited to time period when the items may be picked-up, time period when the user may require the items, price, type of item, entity locations at which the item may be purchased, etc.

In some embodiments, the system is configured to identify alternate or substitute items for one or more items that were input by the user or that were previously purchased/used by the user. In some embodiments, the system communicates with entity systems in order to determine at least one of (i) seasonal items being currently provided by the entity, (ii) substitutes for one or more items input by the user or previously used by the user, and (iii) the offers that the entity may provide based on the items on the dynamic item file. In some embodiments of the invention the system may achieve this by accessing public or private web pages and/or databases of the entities. The substitute or alternative items may be based on item prices, quantity, quality, locations to purchase, etc. For example, the item with the lowest price may be identified as the substitute or alternative item, a highly rated customer quality item may be identified as the substitute or alternative item, a package having the largest quantity may be identified as the substitute or alternative item, a similar item in the same item category available at an entity that is located nearest to the user may be identified as the substitute or alternative item, etc.

In some embodiments, the substitute or alternative items and/or available offers are made available to the user for review, e.g., via a display of the vehicle, via the user device 200 etc. In some embodiments the system may transmit the offers to the user device 200. In other embodiments the user may access the system in order to view the available offers or alternate products.

In some embodiments, the system may identify information about the one or more items on the dynamic item file and further identify offers that the entity is offering for the same or similar items. In this regard, the system may augment one or more items in the dynamic item file with the associated offers. In some embodiments, the system may identify that for a first item on the dynamic item file, a substitute first item has higher item parameters (e.g., more quantity available at the entity location, farther date of expiration, etc.) or an available offer (e.g., rebate, lower price, etc.). The system may then replace the first item with the substitute first item in the dynamic item file, in real-time. The system may perform this modification based on receiving a user confirmation, in response to an item change trigger transmitted to and presented on the user device 200, by the system.

In some embodiments, the system may identify that a second item on the dynamic item file comprises an item type, and that the second item is a seasonal item available in a first time period of a year. The system may then identify a substitute second item that (i) comprises the same item type, and is (ii) available in the current time period. The system may then replace the second item with the substitute second item in the dynamic item file, in real-time. The system may perform this modification based on receiving a user confirmation, in response to an item change trigger transmitted to and presented on the user device 200, by the system.

In some embodiments, the system may identify that a third item on the dynamic item file comprises an item type. The system may then identify a substitute third item, based on determining that (i) the substitute third item comprises the same item type, and (ii) that the user is or has been associated with the substitute third item based on analyzing historical user activity data (e.g., identify the substitute third item based on analyzing ingredients of a meal that the user previously had at a restaurant based on analyzing the associated receipt). The system may then replace the third item with the substitute third item in the dynamic item file, in real-time. The system may perform this modification based on receiving a user confirmation, in response to an item change trigger transmitted to and presented on the user device 200, by the system.

In some embodiments, the system is configured to store the dynamic item file comprising the one or more items in a temporary memory location. Here, the system may transmit the dynamic item file (e.g., via the order placement control signal described below) to the entity system by transmitting a pointer to the temporary memory location, for placing an order. The system delete or remove the dynamic item file from the memory location based on determining that the item transfer (e.g., order pick-up) is complete. In this manner, the present invention allows for reduction in memory requirements.

Typically, the dynamic item file is a secure file that is structured to prevent modification to itself, in some embodiments. In some instances, the system may identify an additional item associated with the user to be included in the dynamic item file to be transmitted to the entity (e.g., for order placement), in real-time, e.g., based on most current user activities, based on user appliance information indicating that a certain item's quantity is below a predetermined threshold, etc. Here, in some instances, the dynamic item file may comprise code that is structured to determine whether the item file has been transmitted, received, reviewed, etc. and prevent or allow modification accordingly. In some instances, in response to determining that (i) the order placement control signal (e.g., comprising the dynamic item file for order placement) has been transmitted to the entity system and that (ii) the item transfer control signal (e.g., for item transfer, or delivery of the items to the user's vehicle) has not been transmitted to the entity system, the dynamic item file may allow the system may augment the dynamic item file with the additional item. Alternatively, in some instances, in response to determining that the item transfer control signal has been transmitted to the entity system, the dynamic item file itself, or the system may (i) prevent modification of the dynamic item file and (ii) automatically construct an additional dynamic item file comprising the additional item. Moreover, as discussed, in response to determining that resource transfer from the user resource to the entity resource is successful, the system may remove the dynamic item file from the temporary memory location.

Next, at block 1020, the system typically identifies an item collection initiation trigger. The item collection initiation trigger may comprise indicating to the entity that the user is seeking to initiate item transfer of one or more items. In this regard, the item collection initiation trigger may comprise the dynamic item file, the one or more items (and/or any associated offers identified previously) and/or a pointer to the dynamic item file's temporary memory location. In some embodiments, the item collection initiation trigger comprises determining a predetermined time for placing the order with the entity. In some embodiments, the system identifies the item collection initiation trigger based on identifying at least one of a current location of a vehicle associated with the user, historical vehicle transit information, current smart appliance parameters associated with the user, and user information. User information as referred to herein may comprise user identifying information, user device identifiers/information, user permissions (e.g., permissions and/or access granted to the system by the user), appliance information associated with the user, historical user activity data, user vehicle information, user calendars, user social media information (e.g., public posts and tags), auxiliary user information regarding other users that are linked or associated with the user, etc.

In some embodiments, the system identifies or determines an item collection initiation trigger based on determining that the current location of the vehicle is within a predetermined proximity of the entity location (e.g., store). In some embodiments, the system identifies an item collection initiation trigger based on determining that the current location of the vehicle is within a predetermined proximity of a predetermined user location (e.g., user residence, user place of work etc.). In some embodiments, the system determines an average time for the entity to procure (e.g., collect/aggregate) the items (e.g., based on historical data, based on receiving input from the entity, etc.). Here, in some embodiments, the system may analyze the user's current location and determine the item collection initiation trigger to be the greater of the average time for the entity to procure the items and an expected time of travel (e.g., based on historical vehicle transit information of the user) from the current user location to the entity location. In other embodiments, the system may determine that an expected future location of the user (e.g., based on user's calendar, social media posts, etc.) vehicle is within a predetermined proximity of the entity location (e.g., store). The system may then determine the item collection initiation trigger to be the greater of the average time for the entity to procure the items and an expected time of travel (e.g., based on historical vehicle transit information of the user) from the expected future user location to the entity location.

In some embodiments, the system identifies or determines an item collection initiation trigger based on requesting and analyzing data or parameters from user appliances (e.g., smart appliance). The user appliances may comprise smart appliances (e.g., refrigerators, washers, cooking ranges, lighting, heating, etc.) which typically comprise one or more sensor devices, actuators, microprocessors, etc., storage or closets having sensors capable of sensing/detecting items (e.g., using cameras, RFID sensors, infrared sensors, etc.), dedicated product/consumer goods ordering devices, home IoT devices, smart speakers, and/or other devices associated with the user. The system may transmit a control signal to a user appliance to activate a sensor associated with the appliance. The system may activate the sensor, automatically and in real-time, based on identifying a trigger, such as opening of a door of the appliance. The system may then analyze the parameters sensed/detected by the sensor and identity addition of, removal of, or changes to one or more items placed in or around the appliance. The system may then deactivate the sensor, thereby selectively activating and deactivating appliances or appliance sensors for identifying items. For example, the system may cause a RFID sensor of a user's smart storage (e.g., a closet) to activate and retrieve the sensed RFID identifiers of items in or around the storage. Based on the analysis in conjunction with the user information, the system may determine an item collection initiation trigger in response to identifying that an item of a predetermined type has been removed from the storage and that the user would likely require a replacement (e.g., based on user historical activity information). As another example, the system may cause a visual capture device type sensor (e.g., a camera) of a user's smart refrigerator to activate and retrieve the captured visual images of items in or around the storage. Based on the analysis in conjunction with the user information, the system may determine an item collection initiation trigger in response to identifying that a number of particular item has fallen below a predetermined threshold (e.g., determined average requirement/consumption of the particular item by the user) and that the user would likely require to order more of the particular item (e.g., based on user historical activity information).

In some embodiments, the system may consider a suitable combination of factors to determine the item collection initiation trigger. For example, the system may identify the item collection initiation trigger, automatically, in response to (i) determining that a number of particular item has fallen below a predetermined threshold in a user applicant and (ii) determining that the current user location or expected future location of the use is within a predetermined proximity of the entity location (e.g., store).

As illustrated by block 1030, for instance, in response to the item collection initiation trigger, the system transmits, automatically, an order placement control signal to an entity system (e.g., system 402) of an item entity to initiate item transfer of the one or more items at a predetermined time interval. In this regard, the item collection initiation trigger may comprise the dynamic item file, the one or more items (and/or any associated offers identified previously) and/or a pointer to the dynamic item file's temporary memory location. In some embodiments, the item collection initiation trigger may comprise a determined predetermined time initiate presentation of a confirmation to the user, e.g., at the user mobile device or at the vehicle display, indicating that the order for the one or more items has been placed with the entity.

As illustrated by block 1040, the system determines, from the vehicle, a travel vector trigger of the vehicle. In some embodiments, the travel vector trigger comprises at least a current geographic location of the vehicle and a current direction of travel. Here, the system may first determine that the user is situated in the vehicle. The system may determine this based on extracting the location information (e.g., GPS coordinates, information from beacons and proximity marker devices, etc.) of the user's vehicle and of the user's mobile device (e.g., smart phone, wearable device, etc.). The system may determine that the user is situated in the vehicle based on determining that the location information of the vehicle matches that of the user's mobile device. Alternatively or in combination with the foregoing, the system may determine that the user is situated in the vehicle based on determining that the user mobile device is tethered to the vehicle (e.g., for the purpose of charging the battery of the user's device), determining that the user mobile device is in wireless connection with the vehicle's communication device (e.g., a near field connection), and/or determining that an application of the user's mobile device is utilizing/operating/transmitting to one or more hardware components of the vehicle (e.g., to the vehicle's speaker devices). Next, the system may determine the current geographic location of the vehicle, based on identifying the GPS coordinates of the vehicle, identifying GPS coordinates of the vehicle, geofencing information from proximate beacons/proximity marker devices, telecommunication tower triangulation, etc. The system may then determine the current direction of travel, for instance, based on tracking the current location for a predetermined time or for a predetermined distance of travel.

In some embodiments, determining the travel vector trigger further comprises determining occupancy of the vehicle and/or availability of accommodation in the vehicle. Here, identifying that the travel vector trigger matches the geographic location parameter of the item entity further comprises (i) determining a packaging size of at least one item of the one or more items, and (ii) determining that the occupancy of the vehicle is below a predetermined threshold such that available space in the vehicle is greater than or equal to the packaging size, as will be described below. First, the system may determine packaging size of at least one item of the one or more items. For instance, the system may determine that a first item in the dynamic item file is of a predetermined type/category (e.g., furniture, appliances, predetermined large bulky item categories such as bottled water, paper towels, etc.) or that the number of the first item being ordered in the dynamic item file is greater than a predetermined threshold (e.g., 50 number/count (predetermined threshold) of bulk paper towels products (first item)). Next, the system may retrieve (e.g., from the entity system) product dimensions and/or packaging dimensions of the first item. The system may then determine the packaging size based on the product dimensions, packaging dimensions or a calculated volume of the item (calculated based on the product dimensions and/or packaging dimensions). Similarly, the system may determine the packaging size of each of a second item, a third item, and so on, from the dynamic item file.

Second, the system may determine the occupancy of the vehicle comprising the number of persons in the vehicle, number and/or size of articles/objects in the vehicle, etc. Here, in some embodiments, the system may determine the number of persons (e.g., including the user) currently situated in the vehicle, e.g., based on retrieving weight sensor/strain gauge data associated with sensors of the seats of the vehicle, based on retrieving seat belt sensor data indicating the number of currently engaged seatbelts, and/or based on analyzing a feed of a visual capture device/camera of the vehicle. In some embodiments, the system may further determine other articles/objects already in the vehicle, such as at the boot or trunk of the vehicle or placed on the seats of the vehicle, e.g., based on retrieving weight sensor/strain gauge data associated with sensors of the seats or trunk/boot of the vehicle and/or based on analyzing a feed of a visual capture device/camera of the vehicle. Next, the system may determine the total interior space volume of the vehicle (e.g., based on determining the model and make of the vehicle from user information). The system may then determine the available space in the vehicle as a difference of (i) the interior space volume of the vehicle and (ii) the occupancy of the vehicle.

Next the system identifies whether the travel vector trigger matches the geographic location parameter of the item entity. In some embodiments, the system determines that the travel vector trigger matches the geographic location parameter of the item entity based on identifying that the current location of the vehicle is within a predetermined proximity (e.g., a different (or closer) proximity/distance than that considered with respect to blocks 1020 or 1030) of the entity location (e.g., store) and/or that the current direction of travel is in the direction of or directed towards the entity location (e.g., store). In some embodiments, the system determines that the travel vector trigger matches the geographic location parameter of the item entity based on determining that the occupancy of the vehicle is below a predetermined threshold such that available space in the vehicle is greater than or equal to the packaging size, as described above, thereby inferring that the vehicle in its current state of occupancy is capable of accommodating the one or more items after pick up from the entity location. In particular, the system may determine that the travel vector trigger matches the geographic location parameter of the item entity based on determining that available space in the vehicle is greater that the individual or combined the packaging size of the one or more items.

In some embodiments, identifying that the travel vector trigger matches the geographic location parameter of the item entity further comprises determining that the vehicle is within a predetermined distance (e.g., a predetermined number feet) of the first parking location.

In some embodiments, identifying that the travel vector trigger matches the geographic location parameter of the item entity further comprises determining that a mobile device of the user and the vehicle are collocated, i.e., situated in (or in the vicinity of) the vehicle. Here, the system may first determine that the user is situated in the vehicle or in the vicinity of the vehicle. The system may determine this based on extracting the location information (e.g., GPS coordinates, information from beacons and proximity marker devices, etc.) of the user's vehicle and of the user's mobile device (e.g., smart phone, wearable device, etc.). The system may determine that the user is situated in the vehicle based on determining that the location information of the vehicle matches that of the user's mobile device. Alternatively or in combination with the foregoing, the system may determine that the user is situated in the vehicle based on determining that the user mobile device is tethered to the vehicle (e.g., for the purpose of charging the battery of the user's device), determining that the user mobile device is in wireless connection with the vehicle's communication device (e.g., a near field connection), and/or determining that an application of the user's mobile device is utilizing/operating/transmitting to one or more hardware components of the vehicle (e.g., to the vehicle's speaker devices).

Moreover, in response to identifying that the travel vector trigger matches a geographic location parameter of the item entity, the system may determine a travel route for the vehicle to direct the vehicle to a first parking location associated with the geographic location parameter of the item entity, as illustrated by block 1050. Typically, the geographic location parameter of the item entity is the entity location information such as entity location coordinates, GPS coordinates of the entity location, entity location address, and/or other entity location identifiers.

In some embodiments, the system identifies a first parking location associated with the entity location (geographic location parameter). Here, the system may analyze a map associated with the entity location to identify potential parking locations. The system may activate sensors associated with the entity location, such as visual capture devices (e.g., cameras), proximity sensors/beacons, etc., and retrieve signals from the sensors associated with the sensors detecting one or more parameters in the vicinity. The system may then analyze the signals from the sensors to identify the first parking location of the potential parking locations, which is available, i.e., the first parking location being (i) unoccupied and (ii) suitable for accommodating the user's vehicle. In some instances the system may identify a plurality of available parking locations and identify the first parking location out of them based on factors such as smallest distance to the entity location, size of the parking location, ease of maneuverability, etc. Moreover, the system may perform the foregoing steps associated with the identification of the first parking location, multiple times (e.g., continuously or at predetermined time intervals), to identify the first parking location, in real-time, to ensure that the first parking location is still available, to ensure that the first parking location is currently the best available parking location, and/or the like. As will be described below, the system may transmit updated instructions to the vehicle and/or to the entity in the event that another, second parking location is identified. Furthermore, the system may identify whether the parking location (e.g., first parking location, second parking location, etc.) requires reservation and/or payment of a fare, and automatically initiate reservation and/or payment of a fare for the parking location.

Moreover, the system typically transmits a control instruction to the vehicle, such that the control instruction is configured to cause a display of the vehicle to present the travel route. In some embodiments, the system may determine the travel route based on historical travel routes employed by the user, based on current traffic conditions, based on suitability of the route for the vehicle (e.g., whether or not the vehicle's engine and transmission are capable for facilitating travel along a slope identified on the route), and/or the like. Here, in some embodiments, the system may determine an estimated time interval of arrival at the first parking location (e.g., based on historical travel times, based on current traffic conditions, based on vehicle engine/transmission performance) and transmit the estimated time of arrival to the entity system (e.g., via the item transfer control signal). Moreover, the system may employ this estimated time of arrival for reservation and/or payment of a fare for the parking location described above.

As discussed, in some embodiments, the system may perform the above discussed steps associated with the identification of the first parking location, multiple times (e.g., continuously or at predetermined time intervals), to identify the first parking location, in real-time, to ensure that the first parking location is still available, to ensure that the first parking location is currently the best available parking location, and/or the like. In some embodiments, the system may continue to perform the above even when the user drives to the first parking location in the vehicle or when the vehicle is proximate the first parking location. In some embodiments, the system is further configured to identify that the first parking location is occupied using a visual capture device associated with the first parking location (e.g., a camera associated with the vehicle, cameras associated with the first parking location, proximity sensors associated with the vehicle and/or the first parking location, etc.). The system may then identify a second parking location parking location associated with the geographic location parameter of the item entity (e.g., store) based on determining that the second parking location is not occupied. Subsequently, the system, automatically and in real-time, may modify the travel route for the vehicle to direct the vehicle to the second parking location, cause the vehicle to present the updated route to the user to direct the vehicle to the second parking location, and transmit an updated control signal to the entity system comprising the second parking location to indicate the change in pick-up location to the entity.

Moreover, in response to identifying that the travel vector trigger matches a geographic location parameter of the item entity, as described above, the system may further transmit an item transfer control signal to the entity system to initiate item transfer of the one or more items in the dynamic item file, as illustrated by block 1060. This item transfer control signal typically comprises the first parking location or an updated second parking location, an typically indicates to the entity that the user is currently at or within a predetermined proximity of the parking location and that the user is ready to receive the delivery/pick-up of the one or more items in the user's vehicle.

In some embodiments, the system may present a graphical representation of the vehicle location at the first parking location to a mobile device of an individual associated with the entity. For instance, the individual may be an employee of the entity associated with the delivery of items to the user. The system may present the parking location (e.g., the first parking location, second parking location, etc.) and/or a route for the individual to direct the individual from their current location to the parking location, in real-time, on a mobile device display associated with the individual. In the event that the parking location is updated, the system may transmit a trigger notification to the mobile device of the individual which is configured to present the updated route in real-time and also lock the display of the mobile device (with the display of the updated route) until the individual is at or within a predetermined proximity of the parking location (e.g., the system may determine this based on retrieving GPS data of the mobile device). The individual may then travel to the parking location where the vehicle is at and initiate transfer of or place the one or more items in the vehicle.

Moreover, the system is configured to activate, manage, or otherwise control a sensor device of the vehicle to identify whether the one or more items are located or have been placed in the vehicle (e.g., an item transfer trigger). These sensor devices may comprise one or more of an RFID sensor (e.g., in the vehicle and/or in the vicinity of the vehicle), a weight sensor (e.g., weight sensors and strain gauges in vehicle seats, in trunk/boot of the vehicle, etc.) or a visual capture device (e.g., cameras associated with the vehicle, with the user mobile device, with the mobile device associated with the individual associated with the entity, with the parking location, etc.). In some embodiments, the system may identify that the one or more items are located in the vehicle based on identifying, via a positioning system of the vehicle, that the vehicle is located at the first parking location. The system may then transmit an activation control signal to the vehicle to cause the activation of the sensor device. The system may transmit this activation control signal based on (i) identifying opening of at least one of a door (e.g., passenger door, trunk/boot door, etc.) or a window of the vehicle, and (ii) determining that the sensor device is configured to detect a vehicle parameter (e.g., weight, pressure, strain, stress, images, objects, items, persons in the vehicle, doors or windows being open or closed, degree of opening of doors/windows, heat map (based on infrared sensors), etc.) within a predetermined proximity of at least one of the door or the window. The system may then retrieve the detected vehicle parameter from the sensor device and subsequently identify that the one or more items are located in the vehicle based on the detected vehicle parameter. In some embodiments, the system may transmit a control signal to a vehicle controller or an engine controller, to prevent the vehicle from moving/travelling until the (i) one or more items have been placed in the vehicle and/or (ii) any open door or window of the vehicle has been closed. This control signal is typically structured to activate a wheel brake of the vehicle, activate a transmission brake of the vehicle, cut-off fuel supply to the engine, and/or the like.

As illustrated by block 1070, the system may initiate, via the display of the vehicle, a resource transfer from a user resource to an entity resource, e.g., in response to identifying that the one or more items are located in the vehicle (e.g., an item transfer trigger). The system may automatically initiate payment for the one or more items, e.g., in the form of transmission of a payment token from the vehicle to a mobile device of the individual (e.g., employee) via a NFC communication channel, without requiring the user to provide payment instruments such as credit cards to the individual. In some embodiments, the system may request a confirmation from the user, via a display device or audio/visual input device of the vehicle, prior to initiating the resource transfer.

In some embodiments, the system may further analyze the one or more items to determine an item weight of each of the one or more items. Based on determining that the cumulative item weight of the one or more items is greater than a predetermined threshold, the system may determine a return route for the vehicle to direct the vehicle from the first parking location (or a second parking location) to a destination location such that a fuel efficiency of the vehicle along the return route is above a fuel efficiency threshold. For instance, based on determining that the items that have been placed in the vehicle comprise a weight that exceeds the predetermined threshold, the system may determine that the weight of the items may adversely affect the driving performance of the vehicle, e.g., for climbing slope, along routes with high speed limits, and/or along routes which require the vehicle to halt (e.g., to a zero vehicle speed) and then accelerate more than a predetermined number of times. The system may then identify that a usual route employed by the user requires one or more of climbing slopes, travel along routes with high speed limits, and/or travel along routes which require the vehicle to halt (e.g., to a zero vehicle speed) and then accelerate more than the predetermined number of times. The system may then identify alternate routes, which provide increased vehicle driving performance and fuel efficiency. These alternate routes identified by the system may be identified based on determining that the alternate route does not require the vehicle to climb slopes, travel along routes with high speed limits, and/or travel along routes which require the vehicle to halt (e.g., to a zero vehicle speed) and then accelerate more than the predetermined number of times. Here, in response to determining that resource transfer from the user resource to the entity resource is successful, the system may present the return route on the display of the vehicle.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. A memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent application:

| U.S. patent application Ser. No. | Title | Filed On |
|---|---|---|
| 15/986,613 | REAL-TIME DATA SERVICES BASED ON GEO-LOCATION INFORMATION | Concurrently Herewith |

What is claimed is:

1. A system for integrated connectivity of devices for resource transmission, wherein the system is configured to provide dynamic control and real-time routing of a vehicle for item transfer and vehicle performance, the system comprising:

a memory device with computer-readable program code stored thereon;
a communication device, wherein the communication device is configured to establish operative communication with a plurality of networked devices via a communication network;
a processing device operatively coupled to the memory device and the communication device, wherein the processing device is configured to execute the computer-readable program code to:
  construct a dynamic item file for a user, wherein the dynamic item file comprises information associated with one or more items associated with the user, wherein constructing the dynamic item file comprises:
    extracting unstructured data associated with one or more items from one or more electronic communications associated with the user;
    parsing the unstructured data;
    converting the unstructured data into a predetermined structured format;
    determining a first historical item obtained by the user at two or more prior times;
    determining an adjusted average time interval associated with the two or more prior times associated with the first historical item, wherein determining the adjusted average time interval comprises (i) determining an average time interval associated with the two or more prior times associated with the first historical item, and (ii) modifying the average time interval with a predetermined tolerance factor;
    determining a current time lag parameter associated with a duration between a current time and a most recent time of the two or more prior times associated with the first historical item; and
    in response to determining that the current time lag parameter is greater than or equal to the adjusted average time interval, adding the first historical item as a first item of the one or more items of the dynamic item file;
  identify an item collection initiation trigger based on identifying at least one of a current geographic location of a vehicle associated with the user, historical vehicle transit information, current smart appliance parameters associated with the user, and user information;
  in response to the item collection initiation trigger, transmit an order placement control signal to an entity system of an item entity to initiate item transfer of the one or more items at a predetermined time interval, wherein the item entity is associated with providing at least one of the one or more items;
  determine, from the vehicle, a travel vector trigger of the vehicle, wherein the travel vector trigger comprises at least the current geographic location of the vehicle and a current direction of travel;
  in response to identifying that the travel vector trigger matches a geographic location parameter of the item entity:
    determine a travel route for the vehicle to direct the vehicle to a first parking location associated with the geographic location parameter of the item entity;

transmit a control instruction to the vehicle, wherein the control instruction is configured to cause a display of the vehicle to present the travel route; and transmit an item transfer control signal to the entity system to initiate item transfer of the one or more items associated with the dynamic item file, wherein the item transfer control signal comprises the first parking location;

identify, via a sensor device of the vehicle, whether the one or more items are located in the vehicle, wherein the one or more items are physical items defining a size and/or a weight;

prevent, via one or more brake devices of the vehicle, movement of the vehicle until the one or more items are located in the vehicle; and in response to identifying that that the one or more items are located in the vehicle, initiate, via the display of the vehicle, a resource transfer from a user resource to an entity resource.

2. The system of claim 1, wherein identifying that the one or more items are located in the vehicle further comprises:

identifying, via a positioning system of the vehicle, that the vehicle is located at the first parking location;

transmitting an activation control signal to the vehicle to cause activation of the sensor device, based on (i) identifying opening of at least one of a door or a window of the vehicle, and (ii) determining that the sensor device is configured to detect a vehicle parameter within a predetermined proximity of at least one of the door or the window, wherein the vehicle parameter comprises a weight parameter, a pressure parameter, a strain parameter, an image parameter, a degree of opening of the door, and/or a degree of opening of the window at predetermined proximity of at least one of the door or the window;

retrieving a detected vehicle parameter from the sensor device; and identifying that the one or more items are located in the vehicle based on the detected vehicle parameter.

3. The system of claim 2, wherein the sensor device comprises at least one of an RFID sensor, a weight sensor and a visual capture device.

4. The system of claim 1, wherein the processing device is further configured to execute the computer-readable program code to:

store the dynamic item file comprising the information associated with the one or more items in a temporary memory location, wherein transmitting the order placement control signal to the entity system comprises transmitting a pointer to the temporary memory location;

identify an additional item associated with the user to be transferred from the entity;

in response to determining that (i) the order placement control signal has been transmitted to the entity system and that (ii) the item transfer control signal has not been transmitted to the entity system, augment the dynamic item file with information associated with the additional item; and in response to determining that the resource transfer from the user resource to the entity resource is successful, remove the dynamic item file from the temporary memory location.

5. The system of claim 1, wherein the processing device is further configured to execute the computer-readable program code to:

store the dynamic item file comprising the information associated with the one or more items in a temporary memory location, wherein transmitting the order placement control signal to the entity system comprises transmitting a pointer to the temporary memory location;

identify an additional item associated with the user to be transferred from the entity;

in response to determining that the item transfer control signal has been transmitted to the entity system, (i) prevent modification of the dynamic item file and (ii) construct an additional dynamic item file comprising information associated with the additional item; and in response to determining that resource transfer from the user resource to the entity resource is successful, remove the dynamic item file from the temporary memory location.

6. The system of claim 1, wherein the processing device is further configured to execute the computer-readable program code to:

present a graphical representation of the vehicle located at the first parking location to a mobile device of an individual associated with the entity, wherein the individual is associated with transporting the one or more items to the vehicle;

identify that the first parking location is occupied using a visual capture device associated with the first parking location, wherein the visual capture device comprises a camera associated with the vehicle, a camera associated with the first parking location, a proximity sensors associated with the vehicle and/or a proximity sensor associated with the first parking location;

identify a second parking location parking location associated with the geographic location parameter of the item entity based on determining that the second parking location is not occupied;

modify the travel route for the vehicle to direct the vehicle to the second parking location; and transmit an updated control signal to the entity system comprising the second parking location, wherein transmitting the updated control signal to the entity system further comprises:

transmitting a trigger notification to the mobile device of the individual associated with the entity;

presenting an updated route on a display device of the mobile device of the individual to direct the individual from a current individual location to the second parking location;

locking the display device of the mobile device of the individual with the presentation of the updated route; and unlocking the display device of the mobile device of the individual in response to determining that the individual is within a predetermined proximity of the second parking location.

7. The system of claim 1, wherein the predetermined tolerance factor is associated with scheduled user visits, seasonal availability of the first historical item, and/or current availability of the first historical item at a user location.

8. The system of claim 1, wherein determining the travel route further comprises determining an estimated time interval of arrival at the first parking location, wherein the item transfer control signal comprises the estimated time interval of arrival.

9. The system of claim 1, wherein the processing device is further configured to execute the computer-readable program code to:

analyze the one or more items to determine an item weight of each of the one or more items;

based on determining that a cumulative item weight of the one or more items is greater than a predetermined threshold, determine a return route for the vehicle to direct the vehicle from the first parking to a destination location such that a fuel efficiency of the vehicle along the return route is above a fuel efficiency threshold, comprising:

constructing the return route such that the return route does not comprise one or more route parameters that adversely affect a driving performance of the vehicle during driving thereon, wherein the one or more route parameters comprise a slope, a speed limit above a predetermined threshold, and/or a number of instances of acceleration from zero greater than a predetermined number of times; and in response to determining that resource transfer from the user resource to the entity resource is successful, initiate presentation of the return route on the display of the vehicle.

10. The system of claim 1, wherein:

determining the travel vector trigger further comprises determining occupancy of the vehicle; and identifying that the travel vector trigger matches the geographic location parameter of the item entity further comprises (i) determining a packaging size of at least one item of the one or more items, and (ii) determining that the occupancy of the vehicle is below a predetermined threshold such that available space in the vehicle is greater than or equal to the packaging size.

11. The system of claim 1, wherein identifying that the travel vector trigger matches the geographic location parameter of the item entity further comprises determining that the vehicle is within a predetermined distance of the first parking location.

12. The system of claim 1, wherein identifying that the travel vector trigger matches the geographic location parameter of the item entity further comprises determining that a mobile device of the user and the vehicle are collocated, wherein determining that the mobile device of the user and the vehicle are collocated further comprises:

determining that (i) the mobile device is tethered to the vehicle, (ii) that the user mobile device is in wireless connection with a communication device of the vehicle, and/or (iii) determining that an application of the mobile device is in operative communication with one or more hardware components of the vehicle.

13. A computer program product for integrated connectivity of devices for resource transmission, wherein the computer program product is configured to provide dynamic control and real-time routing of a vehicle for item transfer and vehicle performance, the computer program product comprising a non-transitory computer-readable storage medium having computer-executable instructions for causing a computer processor to:

construct a dynamic item file for a user, wherein the dynamic item file comprises information associated with one or more items associated with the user, wherein constructing the dynamic item file comprises:

extracting unstructured data associated with one or more items from one or more electronic communications associated with the user;

parsing the unstructured data;

converting the unstructured data into a predetermined structured format;

determining a first historical item obtained by the user at two or more prior times;

determining an adjusted average time interval associated with the two or more prior times associated with the first historical item, wherein determining the adjusted average time interval comprises (i) determining an average time interval associated with the two or more prior times associated with the first historical item, and (ii) modifying the average time interval with a predetermined tolerance factor;

determining a current time lag parameter associated with a duration between a current time and a most recent time of the two or more prior times associated with the first historical item; and in response to determining that the current time lag parameter is greater than or equal to the adjusted average time interval, adding the first historical item as a first item of the one or more items of the dynamic item file;

identify an item collection initiation trigger based on identifying at least one of a current geographic location of a vehicle associated with the user, historical vehicle transit information, current smart appliance parameters associated with the user, and user information;

in response to the item collection initiation trigger, transmit an order placement control signal to an entity system of an item entity to initiate item transfer of the one or more items at a predetermined time interval, wherein the item entity is associated with providing at least one of the one or more items;

determine, from the vehicle, a travel vector trigger of the vehicle, wherein the travel vector trigger comprises at least the current geographic location of the vehicle and a current direction of travel;

in response to identifying that the travel vector trigger matches a geographic location parameter of the item entity:

determine a travel route for the vehicle to direct the vehicle to a first parking location associated with the geographic location parameter of the item entity;

transmit a control instruction to the vehicle, wherein the control instruction is configured to cause a display of the vehicle to present the travel route; and transmit an item transfer control signal to the entity system to initiate item transfer of the one or more items associated with the dynamic item file, wherein the item transfer control signal comprises the first parking location;

identify, via a sensor device of the vehicle, whether the one or more items are located in the vehicle, wherein the one or more items are physical items defining a size and/or a weight;

prevent, via one or more brake devices of the vehicle, movement of the vehicle until the one or more items are located in the vehicle; and in response to identifying that that the one or more items are located in the vehicle, initiate, via the display of the vehicle, a resource transfer from a user resource to an entity resource.

14. The computer program product of claim 13, wherein identifying that the one or more items are located in the vehicle further comprises:

identifying, via a positioning system of the vehicle, that the vehicle is located at the first parking location;

transmitting an activation control signal to the vehicle to cause activation of the sensor device, based on (i) identifying opening of at least one of a door or a window of the vehicle, and (ii) determining that the sensor device is configured to detect a vehicle parameter within a predetermined proximity of at least one of the door or the window, wherein the vehicle parameter comprises a weight parameter, a pressure parameter, a strain parameter, an image parameter, a degree of opening of the door, and/or a degree of opening of the window at predetermined proximity of at least one of the door or the window;

retrieving a detected vehicle parameter from the sensor device; and identifying that the one or more items are located in the vehicle based on the detected vehicle parameter.

15. The computer program product of claim 14, wherein the sensor device comprises at least one of an RFID sensor, a weight sensor and a visual capture device.

16. The computer program product of claim 13, wherein the non-transitory computer-readable storage medium further comprises computer-executable instructions for causing the computer processor to:

store the dynamic item file comprising the information associated with the one or more items in a temporary memory location, wherein transmitting the order placement control signal to the entity system comprises transmitting a pointer to the temporary memory location;

identify an additional item associated with the user to be transferred from the entity;

in response to determining that (i) the order placement control signal has been transmitted to the entity system and that (ii) the item transfer control signal has not been transmitted to the entity system, augment the dynamic item file with information associated with the additional item; and in response to determining that the resource transfer from the user resource to the entity resource is successful, remove the dynamic item file from the temporary memory location.

17. The computer program product of claim 13, wherein the non-transitory computer-readable storage medium further comprises computer-executable instructions for causing the computer processor to:

present a graphical representation of the vehicle located at the first parking location to a mobile device of an individual associated with the entity, wherein the individual is associated with transporting the one or more items to the vehicle;

identify that the first parking location is occupied using a visual capture device associated with the first parking location, wherein the visual capture device comprises a camera associated with the vehicle, a camera associated with the first parking location, a proximity sensors associated with the vehicle and/or a proximity sensor associated with the first parking location;

identify a second parking location parking location associated with the geographic location parameter of the item entity based on determining that the second parking location is not occupied;

modify the travel route for the vehicle to direct the vehicle to the second parking location; and transmit an updated control signal to the entity system comprising the second parking location, wherein transmitting the updated control signal to the entity system further comprises:

transmitting a trigger notification to the mobile device of the individual associated with the entity;

presenting an updated route on a display device of the mobile device of the individual to direct the individual from a current individual location to the second parking location;

locking the display device of the mobile device of the individual with the presentation of the updated route; and unlocking the display device of the mobile device of the individual in response to determining that the individual is within a predetermined proximity of the second parking location.

18. A computerized method for integrated connectivity of devices for resource transmission, wherein the computerized method is configured to provide dynamic control and real-time routing of a vehicle for item transfer and vehicle performance, the computerized method comprising:

constructing a dynamic item file for a user, wherein the dynamic item file comprises information associated with one or more items associated with the user, wherein constructing the dynamic item file comprises:

extracting unstructured data associated with one or more items from one or more electronic communications associated with the user;

parsing the unstructured data;

converting the unstructured data into a predetermined structured format;

determining a first historical item obtained by the user at two or more prior times;

determining an adjusted average time interval associated with the two or more prior times associated with the first historical item, wherein determining the adjusted average time interval comprises (i) determining an average time interval associated with the two or more prior times associated with the first historical item, and (ii) modifying the average time interval with a predetermined tolerance factor;

determining a current time lag parameter associated with a duration between a current time and a most recent time of the two or more prior times associated with the first historical item; and in response to determining that the current time lag parameter is greater than or equal to the adjusted average time interval, adding the first historical item as a first item of the one or more items of the dynamic item file;

identifying an item collection initiation trigger based on identifying at least one of a current geographic location of a vehicle associated with the user, historical vehicle transit information, current smart appliance parameters associated with the user, and user information;

in response to the item collection initiation trigger, transmitting an order placement control signal to an entity system of an item entity to initiate item transfer of the one or more items at a predetermined time interval, wherein the item entity is associated with providing at least one of the one or more items;

determining, from the vehicle, a travel vector trigger of the vehicle, wherein the travel vector trigger comprises at least the current geographic location of the vehicle and a current direction of travel;

in response to identifying that the travel vector trigger matches a geographic location parameter of the item entity:

determining a travel route for the vehicle to direct the vehicle to a first parking location associated with the geographic location parameter of the item entity;

transmitting a control instruction to the vehicle, wherein the control instruction is configured to cause a display of the vehicle to present the travel route; and transmitting an item transfer control signal to the entity system to initiate item transfer of the one or more items associated with the dynamic item file, wherein the item transfer control signal comprises the first parking location;

identifying, via a sensor device of the vehicle, whether the one or more items are located in the vehicle, wherein the one or more items are physical items defining a size and/or a weight;

preventing, via one or more brake devices of the vehicle, movement of the vehicle until the one or more items are located in the vehicle; and in response to identifying that that the one or more items are located in the vehicle, initiating, via the display of the vehicle, a resource transfer from a user resource to an entity resource.

19. The computerized method of claim 18, wherein identifying that the one or more items are located in the vehicle further comprises:

identifying, via a positioning system of the vehicle, that the vehicle is located at the first parking location;

transmitting an activation control signal to the vehicle to cause activation of the sensor device, based on (i) identifying opening of at least one of a door or a window of the vehicle, and (ii) determining that the sensor device is configured to detect a vehicle parameter within a predetermined proximity of at least one of the door or the window, wherein the vehicle parameter comprises a weight parameter, a pressure parameter, a strain parameter, an image parameter, a degree of opening of the door, and/or a degree of opening of the window at predetermined proximity of at least one of the door or the window;

retrieving a detected vehicle parameter from the sensor device; and identifying that the one or more items are located in the vehicle based on the detected vehicle parameter.

20. The computerized method of claim 19, wherein the sensor device comprises at least one of an RFID sensor, a weight sensor and a visual capture device.

* * * * *